United States Patent
Araki et al.

(10) Patent No.: US 8,862,301 B2
(45) Date of Patent: Oct. 14, 2014

(54) INVERTED PENDULUM TYPE VEHICLE

(71) Applicant: Honda Motor Co., Ltd., Tokyo (JP)

(72) Inventors: Makoto Araki, Saitama (JP); Shinya Shirokura, Saitama (JP); Toru Takenaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/890,634

(22) Filed: May 9, 2013

(65) Prior Publication Data

US 2013/0304290 A1 Nov. 14, 2013

(30) Foreign Application Priority Data

May 14, 2012 (JP) ................... 2012-111063

(51) Int. Cl.
| | |
|---|---|
| *B62K 3/00* | (2006.01) |
| *B62K 1/00* | (2006.01) |
| *B60B 19/00* | (2006.01) |
| *B62K 17/00* | (2006.01) |

(52) U.S. Cl.
CPC . *B62K 3/007* (2013.01); *B62K 1/00* (2013.01); *B60B 19/003* (2013.01); *B62K 17/00* (2013.01); *Y02T 10/7241* (2013.01)
USPC ........................................................ 701/22

(58) Field of Classification Search
USPC ........................................................ 701/22
See application file for complete search history.

(56) References Cited

U.S. PATENT DOCUMENTS

| | | | | |
|---|---|---|---|---|
| 6,896,078 | B2 * | 5/2005 | Wakui | 180/7.1 |
| 7,024,842 | B2 * | 4/2006 | Hunt et al. | 56/6 |
| 7,318,628 | B2 * | 1/2008 | Guile | 301/5.23 |
| 7,823,676 | B2 * | 11/2010 | Yamada et al. | 180/218 |
| 8,267,213 | B2 * | 9/2012 | Takenaka | 180/222 |
| 8,494,746 | B2 * | 7/2013 | Akimoto et al. | 701/70 |
| 8,577,576 | B2 * | 11/2013 | Takenaka et al. | 701/70 |
| 8,583,353 | B2 * | 11/2013 | Kosaka | 701/124 |
| 2009/0051136 | A1 * | 2/2009 | Yamada et al. | 280/205 |
| 2011/0209932 | A1 * | 9/2011 | Takenaka et al. | 180/15 |
| 2012/0168235 | A1 | 7/2012 | Gomi et al. | |

FOREIGN PATENT DOCUMENTS

WO 2011/033575 A1 3/2011

* cited by examiner

*Primary Examiner* — Thomas Tarcza
*Assistant Examiner* — Alex C Dunn
(74) *Attorney, Agent, or Firm* — Carrier Blackman & Associates, P.C.; Joseph P. Carrier; Michael J. McCandlish

(57) ABSTRACT

An inverted pendulum type vehicle includes a control device which sets a target turning angular velocity ωz_cmd to a nonzero value not only when a predetermined steering operation is performed but also at least in an external force application state in which an external force for turning the vehicle about a yaw axis is applied to the vehicle. The control device controls a first actuator device and a second actuator device such that a second moving operation unit has a different velocity from a first moving operation unit in a left-right direction. Such an inverted pendulum type vehicle makes it possible to turn the vehicle easily even in a state in which no steering operation is performed.

20 Claims, 9 Drawing Sheets

INVERTED PENDULUM TYPE VEHICLE

CROSS-REFERENCE TO RELATED APPLICATIONS

The present invention claims priority under 35 USC 119 based on Japanese patent application No. 2012-111063, filed on May 14, 2012. The entire subject matter of this priority document, including specification claims and drawings thereof, is incorporated by reference herein.

BACKGROUND OF THE INVENTION

1. Field of the Invention

The present invention relates to an inverted pendulum type vehicle operable to move on a floor surface. More particularly, the present invention relates to an inverted pendulum type vehicle including a control device, which operable to perform a turning processing of the vehicle when a predetermined steering operation is performed and also when an external force is applied about a yaw axis of the vehicle.

2. Description of the Background Art

There is known inverted pendulum type vehicle in which an occupant boarding member capable of tilting with respect to a vertical direction is assembled to a base to which a moving operation part for moving on a floor surface and an actuator device for driving the moving operation part are assembled. An example of such known inverted pendulum type vehicle is disclosed in the PCT Patent Publication No. WO2011/33575.

The inverted pendulum type vehicle controls the moving operation of the moving operation part in such a form as to move the fulcrum of an inverted pendulum in order to prevent the occupant boarding member on which an occupant is boarded from inclining to fall down.

In the PCT Patent Publication No. WO2011/33575, for example, an inverted pendulum type vehicle has been proposed by the present applicant, which can be moved on a floor surface in all directions including the forward-rearward direction and the left-right direction of an occupant by driving a (first) moving operation part according to the tilting of an occupant boarding member or the like.

A conventional inverted pendulum type vehicle, such as shown in the PCT Patent Publication No. WO2011/33575, allows an occupant to turn the vehicle by moving the upper body of the occupant in such a manner as to change the moving direction of the vehicle gradually, but generally requires skillful steering techniques of the occupant in order to make the turn smoothly.

Thus, for a smooth turn, a (second) moving operation part (which will hereinafter be referred to as an "auxiliary moving operation part") that is coupled to the base such that an interval exists between the auxiliary moving operation part and the first moving operation part present in the forward-rearward direction and which can move in all the directions including the forward-rearward direction and the left-right direction may be added to the vehicle, and control may be performed so as to impart a driving force to the auxiliary moving operation part so that the auxiliary moving operation part can move in at least the left-right direction. In this case, the vehicle can be turned smoothly by controlling the first moving operation part and the auxiliary moving operation part such that the auxiliary moving operation part has a different velocity from the moving operation part in the left-right direction.

However, the first moving operation part and the auxiliary moving operation part are controlled so as not to move in a state in which no steering operation for moving or turning the vehicle is performed, such as during a stop, for example. In such a state, even when the occupant attempts to make a turn (including a change of direction) by adding an external force to the vehicle with one foot of the occupant touched to the floor surface, it is difficult to turn the vehicle because the movements of the first moving operation part and the auxiliary moving operation part are suppressed.

The present invention has been made in view of such a background. Accordingly, it is one of the objects of the present invention to provide an inverted pendulum type vehicle that makes it possible to turn the vehicle easily even in a state in which no steering operation is performed.

SUMMARY OF THE INVENTION

In order to achieve the above objects, the present invention provides an inverted pendulum type vehicle including at least a first moving operation unit capable of moving on a floor surface, a first actuator device for driving the first moving operation unit, a base assembled with the first moving operation unit and the first actuator device, and an occupant boarding member assembled to the base so as to be tiltable with respect to a vertical direction, the first moving operation unit being configured to move in all directions including a forward-rearward direction and a left-right direction of an occupant boarded on the occupant boarding member by a driving force of the first actuator device. The inverted pendulum type vehicle includes a second moving operation unit coupled to the first moving operation unit or the base such that an interval exists between the second moving operation unit and the first moving operation unit present in the forward-rearward direction of the vehicle, and is configured to move on the floor surface in all the directions; a second actuator device for generating a driving force for making at least the second moving operation unit move in the left-right direction; and a control device for performing a turning processing for controlling the first actuator device and the second actuator device such that the second moving operation unit has a different velocity from the first moving operation unit in the left-right direction when the occupant boarded on the occupant boarding member performs a predetermined steering operation of steering the inverted pendulum type vehicle so as to turn the inverted pendulum type vehicle. The control device is operable to perform the turning processing not only when the predetermined steering operation is performed but also when at least in an external force application state, i.e., when an external force for turning the inverted pendulum type vehicle about a yaw axis is applied to the inverted pendulum type vehicle.

According to the present invention, when the occupant boarded on the occupant boarding member performs the predetermined steering operation so as to turn the inverted pendulum type vehicle, the control device performs the turning processing for controlling the first actuator device and the second actuator device such that the second moving operation unit have a different velocity from the first moving operation unit in the left-right direction. Thus, there occurs a velocity difference between the moving velocities in the left-right direction of the first moving operation unit and the moving velocity in the left-right direction of the second moving operation unit. The inverted pendulum type vehicle is thereby turned (including a change of direction).

Further, the turning processing is performed not only in the case where the predetermined steering operation is performed but also at least in the external force application state in which an external force for turning the inverted pendulum type vehicle about the yaw axis is applied to the inverted pendulum type vehicle. Therefore, according to the inverted pendulum type vehicle in accordance with the present invention, the vehicle can be turned easily even in the state in which no steering operation is performed.

According to the present invention, the inverted pendulum type vehicle further includes a turning angular velocity detecting unit for detecting a turning angular velocity of the inverted pendulum type vehicle. The external force application state includes at least a state of the predetermined steering operation not being performed and magnitude of the turning angular velocity detected by the turning angular velocity detecting unit being equal to or more than a predetermined first value.

For example, in a state of a turn being made at a very slight angular velocity by slight movement of the body of the occupant (the angular velocity is less than the predetermined first value), for example, the occupant generally does not intend to turn the inverted pendulum type vehicle. However, if such a state is included as an external force application state, the control device performs the turning processing. A turn not intended by the occupant may thereby occur.

In view of the above, the external force application state includes at least a "state of the predetermined steering operation not being performed and the detected turning angular velocity being equal to or more than the predetermined first value." Thus, a "state of the predetermined steering operation not being performed and the detected turning angular velocity being less than the predetermined first value" is not included in the external force application state, and the turning processing is not performed in the state not included in the external force application state. A turn not intended by the occupant is thereby prevented, so that the controllability of the inverted pendulum type vehicle can be improved.

According to another aspect of the present invention, the control device increases magnitude of a target turning angular velocity, the target turning angular velocity being a turning angular velocity as a target for the inverted pendulum type vehicle in the turning processing, as magnitude of a detected turning angular velocity as the turning angular velocity detected by the turning angular velocity detecting unit is increased, in the external force application state, and the control device controls the first actuator device and the second actuator device so that an actual turning angular velocity of the inverted pendulum type vehicle becomes the target turning angular velocity. The controllability of the inverted pendulum type vehicle can be improved by thus increasing the target turning angular velocity as the detected turning angular velocity is increased in the external force application state.

According to another aspect of the present invention, when the magnitude of the detected turning angular velocity exceeds a predetermined second value in the external force application state, the control device limits the magnitude of the target turning angular velocity to a predetermined first upper limit value.

The control device thus limits the target turning angular velocity to the predetermined first upper limit value when the inverted pendulum type vehicle has a high turning angular velocity (is turning fast) in the external force application state. Therefore the inverted pendulum type vehicle can be prevented from turning at a higher velocity than the predetermined second value (turning fast, for example).

According to an aspect of the present invention, the inverted pendulum type vehicle further includes a state quantity detecting unit (also referred to as a current sensor) for detecting a state quantity representing the driving force of the first actuator device or the second actuator device. The external force application state includes at least a state of the predetermined steering operation not being performed and magnitude of the state quantity detected by the state quantity detecting unit being equal to or more than a predetermined third value.

For example, in a case where the occupant turns the inverted pendulum type vehicle with one foot of the occupant touched to the floor surface, an external force for turning the inverted pendulum type vehicle acts from the occupant on the inverted pendulum type vehicle. At this time, at least one of the first actuator device and the second actuator device is generating a driving force so as to resist the external force for turning the inverted pendulum type vehicle as if the external force were not acting on the inverted pendulum type vehicle.

However, the driving force is generally sufficiently small when the occupant does not intend to turn the inverted pendulum type vehicle as in a case where the occupant slightly moves the body of the occupant in a state of touching one foot to the floor surface. Thus the state quantity representing the driving force is also small (the state quantity is less than the predetermined third value). If the control device performs the turning processing in such a case, a turn not intended by the occupant may occur.

In view of the above, the external force application state includes at least a "state of the predetermined steering operation not being performed and the detected state quantity being equal to or more than the predetermined third value." Thus, a "state of the predetermined steering operation not being performed and the detected state quantity being less than the predetermined third value" is not included in the external force application state, and the turning processing is not performed in the state not included in the external force application state. A turn not intended by the occupant is thereby prevented, so that the controllability of the inverted pendulum type vehicle can be improved.

According to another aspect of the present invention, the control device increases magnitude of a target turning angular velocity, the target turning angular velocity being a turning angular velocity as a target for the inverted pendulum type vehicle in the turning processing, as magnitude of a detected state quantity as the state quantity detected by the state quantity detecting unit is increased, in the external force application state, and the control device controls the first actuator device and the second actuator device so that an actual turning angular velocity of the inverted pendulum type vehicle becomes the target turning angular velocity.

The inverted pendulum type vehicle turns at a higher angular velocity as the external force for turning the inverted pendulum type vehicle is increased. That is, by increasing the target turning angular velocity as the detected state quantity representing the external force increases, the control device controls the first actuator device or the second actuator device so as to achieve the turning angular velocity corresponding to the external force for turning the inverted pendulum type vehicle. Because the turning angular velocity corresponding to the external force applied when the inverted pendulum type vehicle turns is thus achieved in the external force application state, the controllability of the inverted pendulum type vehicle can be improved.

According to another aspect of the present invention, when the magnitude of the detected state quantity exceeds a predetermined fourth value in the external force application state, the control device limits the magnitude of the target turning angular velocity to a predetermined second upper limit value.

The control device thus limits the target turning angular velocity to the predetermined second upper limit value when the state quantity is large (the inverted pendulum type vehicle is turning fast) in the external force application state. Therefore, the inverted pendulum type vehicle can be prevented from turning in a state of the state quantity being larger than the predetermined fourth value (turning fast, for example).

According to an aspect of the present invention, the control device does not perform the turning processing when a target value or an observed value of a moving velocity in at least the forward-rearward direction of the inverted pendulum type vehicle is equal to or more than a predetermined fifth value at least in a state of the predetermined steering operation not being performed and in the external force application state.

Thus, the turning processing is not performed at least in a state of the predetermined steering operation not being performed and the inverted pendulum type vehicle moving at a velocity higher than a low velocity in the external force application state (the target value or the observed value of the moving velocity being equal to or more than the predetermined fifth value). Therefore, the inverted pendulum type vehicle can be prevented from being turned by an external force in a state of a high moving velocity, so that the controllability of the inverted pendulum type vehicle can be improved.

Incidentally, an "observed value" relating to an arbitrary state quantity such as a moving velocity or the like in the present invention means, as appropriate, a detected value of the state quantity which detected value is detected by a sensor or an estimated value estimated from one or more other detected values having a certain correlation to the state quantity on the basis of the correlation.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

An embodiment of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

An inverted pendulum type vehicle according to an illustrative embodiment of the present invention will next be described.

Figure 1:
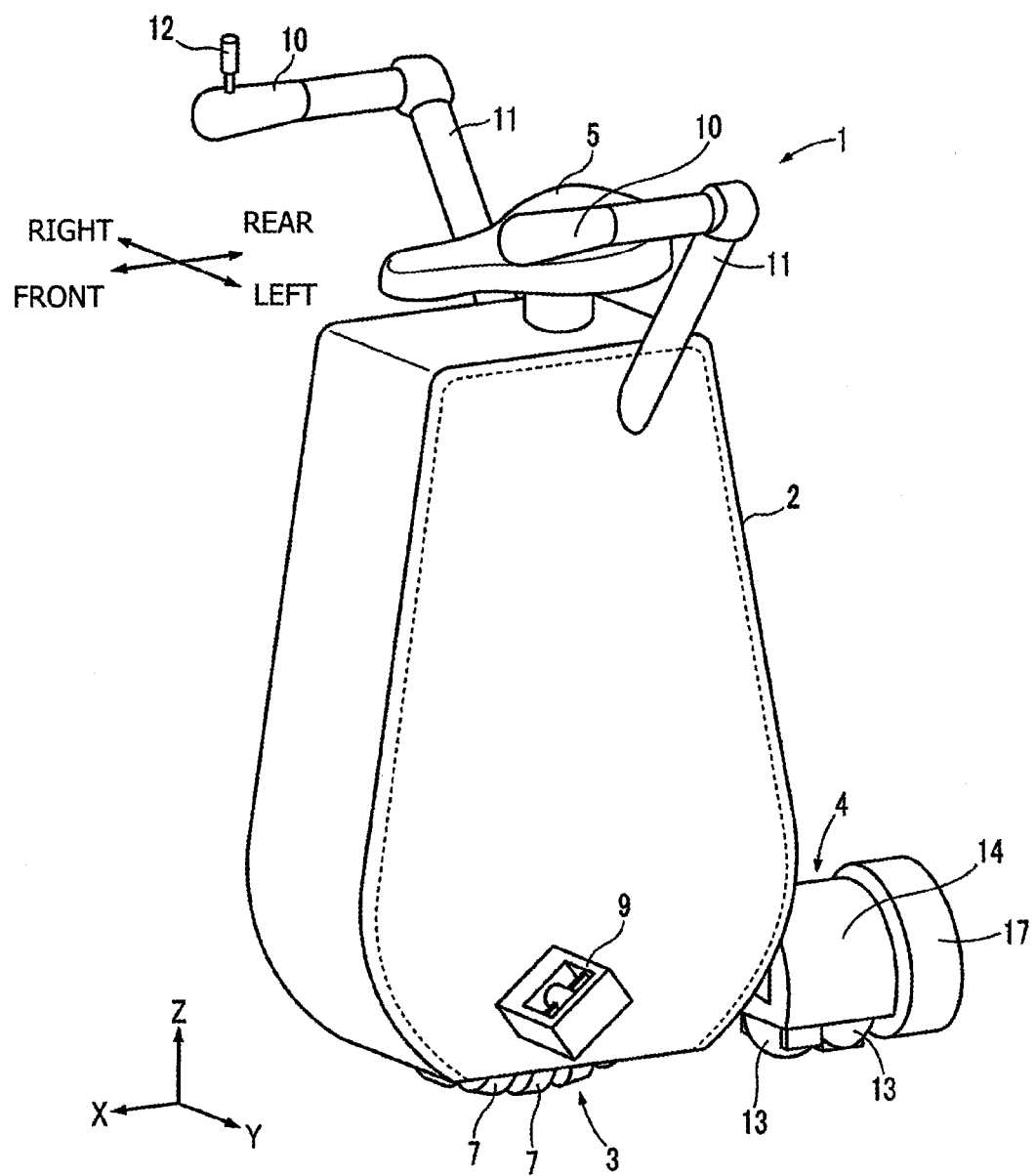
FIG. 1 is an external perspective view of an inverted pendulum type vehicle according to an illustrative embodiment of the present invention.
Figure 2:
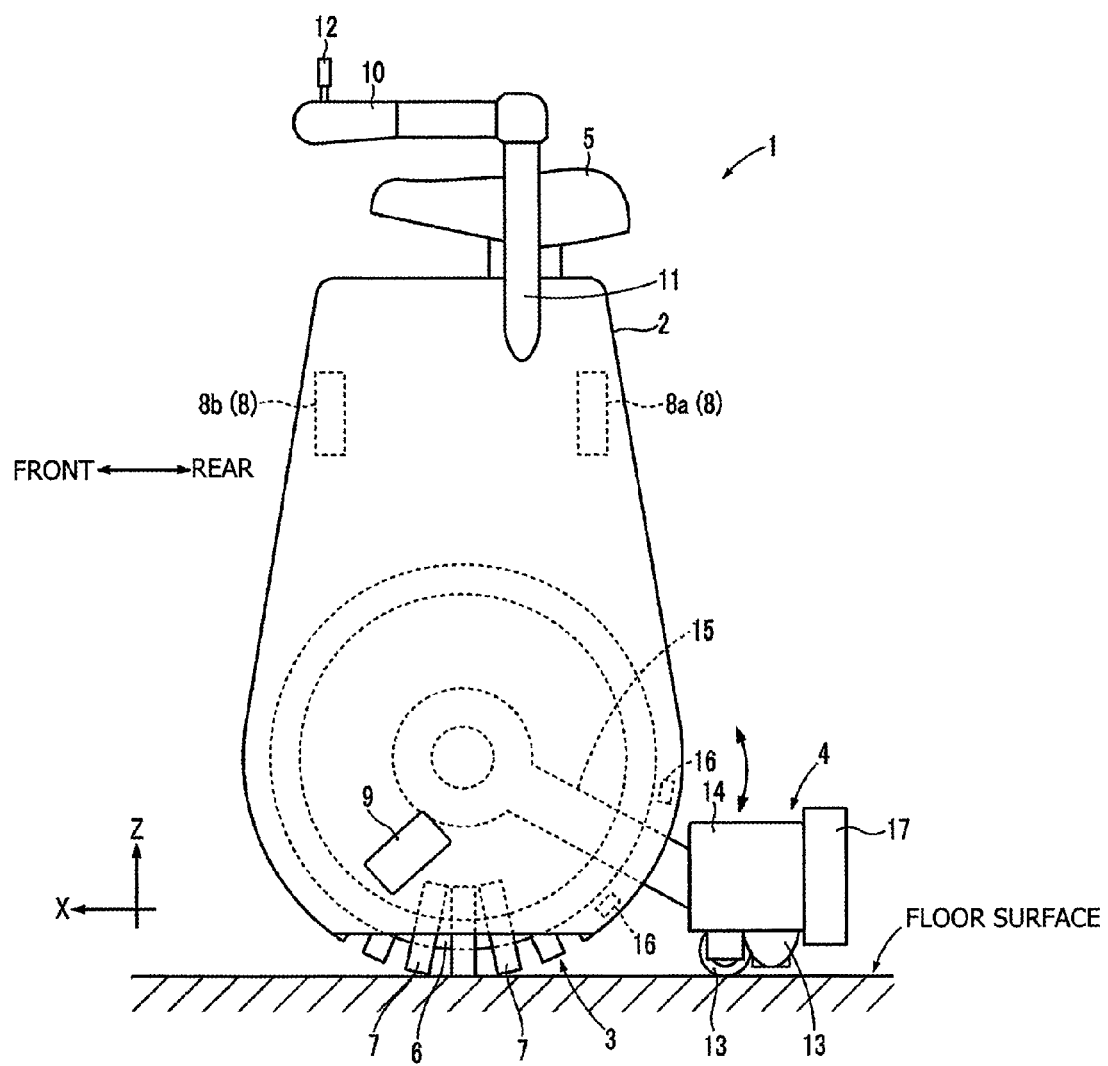
FIG. 2 is a side view of the inverted pendulum type vehicle according to the embodiment.

As shown in FIG. 1 and FIG. 2, the inverted pendulum type vehicle 1 (which inverted pendulum type vehicle 1 may hereinafter be referred to simply as a vehicle 1) according to the present embodiment includes a base 2, a first moving operation unit 3 and a second moving operation unit 4 movable on a floor surface, and an occupant boarding member 5 on which an occupant is boarded.

The first moving operation unit 3 includes a core body 6 in an annular shape shown in FIG. 2 (a core body 6 maybe hereinafter be referred to as an annular core body 6) and a plurality of rollers 7 in an annular shape which rollers are mounted on the annular core body 6 in such a manner as to be arranged at equal angular intervals in the circumferential direction (direction about the axis) of the annular core body 6. The rollers 7 are externally inserted into the annular core body 6 with the axis of rotation of the rollers 7 directed to the circumferential direction of the annular core body 6. Then, the rollers 7 are rotatable integrally with the annular core body 6 about the axis of the annular core body 6, and are rotatable about the central axis of a cross section of the annular core body 6 (circumferential axis having the axis of the annular core body 6 as a center thereof).

The first moving operation unit 3 having the annular core body 6 and the plurality of rollers 7 is grounded on the floor surface via the rollers 7 (rollers 7 situated at the lower part of the annular core body 6) in a state of the axis of the annular core body 6 being directed in parallel with the floor surface. In the grounded state, the annular core body 6 is rotation-driven about the axis of the annular core body 6, so that the whole of the annular core body 6 and the rollers 7 rotates. The first moving operation unit 3 thereby moves on the floor surface in a direction orthogonal to the axis of the annular core body 6. In addition, in the grounded state, the rollers 7 are rotation-driven about the axis of rotation of the rollers 7. The first moving operation unit 3 thereby moves in the direction of the axis of the annular core body 6.

Further, the rotation driving of the annular core body 6 and the rotation driving of the rollers 7 move the first moving operation unit 3 in a direction inclined with respect to the direction orthogonal to the axis of the annular core body 6 and the direction of the axis of the annular core body 6.

The first moving operation unit 3 can thereby move in all directions on the floor surface.

In the following description, as shown in FIG. 1 and FIG. 2, of the moving directions of the first moving operation unit 3, the direction orthogonal to the axis of the annular core body 6 will be set as an X-axis direction, the direction of the axis of the annular core body 6 will be set as a Y-axis direction, and a vertical direction will be set as a Z-axis direction. A forward direction will be set as the positive direction of the X-axis, a left direction will be set as the positive direction of the Y-axis, and an upward direction will be set as the positive direction of the Z-axis.

The first moving operation unit 3 is assembled in the base 2. More specifically, the base 2 is provided so as to cover the periphery of parts of the first moving operation unit 3 excluding the underpart of the first moving operation unit 3 which is grounded on the floor surface. The annular core body 6 of the first moving operation unit 3 is supported by the base 2 so as to be rotatable about the axis of the annular core body 6.

The base 2 is tiltable about the axis of the annular core body 6 of the first moving operation unit 3 (about the Y-axis) with the axis of the annular core body 6 as a supporting point. The base 2 is tilted with respect to the floor surface together with the first moving operation unit 3. Thus, the base 2 is tiltable about the X-axis orthogonal to the axis of the annular core body 6 with the grounded part of the first moving operation unit 3 as a supporting point. The base 2 is therefore tiltable about the two axes with respect to the vertical direction.

In addition, as shown in FIG. 2, a first actuator device 8 generating a driving force for moving the first moving operation unit 3 is mounted within the base 2. The first actuator device 8 includes a electric motor 8a (first motor) as an actuator for rotation-driving the annular core body 6 and another electric motor 8b (second motor) as an actuator for rotation-driving the rollers 7. The electric motors 8a and 8b respectively give a rotation driving force to the annular core body 6 and the rollers 7 via a power transmission mechanism (not shown). A known structure suffices for such power transmission mechanism.

It may be noted that the first moving operation unit 3 may have a different structure from the above-described structure. For example, a structure proposed by the present applicant in the patent documents PCT Patent Publication No. WO2008/132778 or PCT Patent Publication No. WO2008/132779 may be adopted as the structure of the first moving operation unit 3 and a driving system therefor.

The occupant boarding member 5 is assembled on the base 2. The occupant boarding member 5 includes a seat on which an occupant is to be seated. The occupant boarding member is fixed to an upper end part of the base 2. An occupant can be seated on the occupant boarding member 5 with the forward-rearward direction of the occupant directed to the X-axis direction and with the left-right direction of the occupant directed to the Y-axis direction. In addition, because the occupant boarding member 5 (seat) is fixed to the base 2, the occupant boarding member 5 is tiltable with respect to the vertical direction integrally with the base 2.

A pair of footrest members 9 and 9 on which the occupant seated on the occupant boarding member 5 is to put the feet of the occupant and a pair of holding members 10 and 10 to be held by the occupant are further assembled on the base 2.

The footrest members 9 and 9 are projected from the lower parts of both sides of the base 2. It may be noted that, FIG. 1 and FIG. 2 do not show the footrest member 9 on one side (right side).

In addition, the holding members 10 and 10 are in the shape of a bar disposed so as to extend in the X-axis direction (forward-rearward direction) on both sides of the occupant boarding member 5. The holding members 10 and 10 are each fixed to the base 2 via a rod 11 extended from the base 2. A joystick 12 as an operating device is attached to one of the holding members 10 and 10 (the holding member 10 on the right side in the FIGS. 1 and 2).

The joystick 12 is capable of swinging operation in the forward-rearward direction (X-axis direction) and the left-right direction (Y-axis direction). The joystick 12 outputs an operation signal indicating an amount of swing in the forward-rearward direction (X-axis direction) as a command for moving the vehicle 1 forward or rearward, and outputs an operation signal indicating an amount of swing in the left-right direction (Y-axis direction) as a command for turning the vehicle 1 clockwise or counterclockwise (turning command).

According to the present embodiment, as for the amount of swing in the forward-rearward direction (that is, an amount of rotation about the Y-axis) of the joystick 12, an amount of swing in a forward direction is positive, and an amount of swing in a rearward direction is negative. In addition, as for the amount of swing in the left-right direction (that is, an amount of rotation about the X-axis) of the joystick 12, an amount of swing in a left direction is positive, and an amount of swing in a right direction is negative.

The second moving operation unit 4 in the present embodiment is formed by a so-called omniwheel. The omniwheel as the second moving operation unit 4 has a known structure including a pair of coaxial annular core bodies (not shown) and a plurality of rollers 13 in the shape of a barrel which rollers are externally inserted into each of the annular core bodies so as to be rotatable with the axis of rotation of the rollers 13 directed to the circumferential direction of the annular core bodies.

The second moving operation unit 4 is disposed in the rear of the first moving operation unit 3 with the axis of the pair of annular core bodies directed to the X-axis direction (forward-rearward direction), and is grounded on the floor surface via the rollers 13.

The rollers 13 on one side of the pair of annular core bodies and the rollers 13 on the other side are disposed so as to be out of phase with each other in the circumferential direction of the annular core bodies, so that one of the rollers 13 on one side of the pair of annular core bodies and the rollers 13 on the other side is grounded on the floor surface at a time of rotation of the pair of annular core bodies.

The second moving operation unit 4 formed by the above-described omniwheel is coupled to the base 2. More specifically, the second moving operation unit 4 has a casing 14 covering a part on the upper side of the omniwheel (whole of the pair of annular core bodies and the plurality of rollers 13). The pair of annular core bodies of the omniwheel is rotatably supported by the casing 14 so as to be rotatable about the axis of the pair of annular core bodies. Further, an arm 15 extended from the casing 14 to the side of the base 2 is rotatably supported by the base 2 so as to be swingable about the axis of the annular core body 6 of the first moving operation unit 3. The second moving operation unit 4 is thereby coupled to the base 2 via the arm 15.

The second moving operation unit 4 is swingable about the axis of the annular core body 6 of the first moving operation unit 3 with respect to the base 2 due to the swinging of the arm 15. Accordingly, the occupant boarding member 5 can be tilted about the Y-axis together with the base 2 while both of the first moving operation unit 3 and the second moving operation unit 4 remain grounded.

The arm 15 may be rotatably supported by the axial part of the annular core body 6 of the first moving operation unit 3, and the second moving operation unit 4 may be coupled to the first moving operation unit 3 via the arm 15.

In addition, a pair of stoppers 16 and 16 for limiting the swinging range of the arm 15 is provided in the base 2 so that the arm 15 can swing within the range between the stoppers 16 and 16. Thereby, the swinging range of the second moving operation unit 4 about the axis of the annular core body 6 of the first moving operation unit 3 and, in turn, the titling range of the base 2 and the occupant boarding member 5 about the X-axis are limited, and the base 2 and the occupant boarding member 5 are prevented from being tilted to the rear side of the occupant too much.

Incidentally, the second moving operation unit 4 may be biased by a spring so as to be pressed against the floor surface.

The second moving operation unit 4 can move on the floor surface in all directions including the X-axis direction and the Y-axis direction, as with the first moving operation unit 3, by one or both of the rotation of the pair of annular core bodies and the rotation of the rollers 13 as described above. Specifically, the second moving operation unit 4 can move in the Y-axis direction (left-right direction) by the rotation of the annular core bodies, and can move in the X-axis direction (forward-rearward direction) by the rotation of the rollers 13.

In addition, an electric motor 17 as a second actuator device for driving the second moving operation unit 4 is attached to the casing 14 of the second moving operation unit 4. The electric motor 17 is coupled to the pair of annular core bodies of the second moving operation unit 4 so as to rotation-drive the pair of annular core bodies.

Hence, in the present embodiment, the second moving operation unit 4 moves in the X-axis direction in a driven manner so as to follow the movement of the first moving operation unit 3 in the X-axis direction, and the second moving operation unit 4 moves in the Y-axis direction by the rotation driving of the pair of annular core bodies of the second moving operation unit 4 by the electric motor 17.

It may be noted that, the second moving operation unit 4 may have a similar structure to that of the first moving operation unit 3.

The above-described constitution is the mechanistic constitution of the inverted pendulum type vehicle 1 according to the illustrative embodiment.

Figure 3:
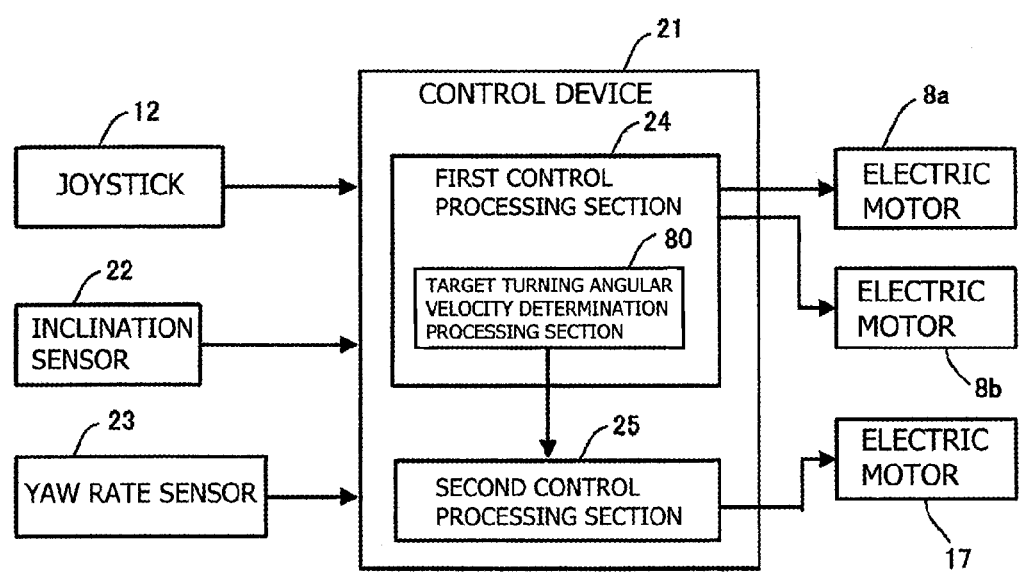
FIG. 3 is a block diagram showing a configuration for the control of the inverted pendulum type vehicle according to the first embodiment.

Although not shown in FIG. 1 nor FIG. 2, as a constitution for controlling the operation of the vehicle 1 (controlling the operation of the first moving operation unit 3 and the second moving operation unit 4), as shown in FIG. 3, the base 2 of the vehicle 1 according to the present embodiment includes: a control device 21 formed by an electronic circuit unit including a CPU, a RAM, a ROM, and the like; an inclination sensor 22 for measuring the angle of inclination of the occupant boarding member 5 (angle of inclination of the base 2) with respect to the vertical direction; and a yaw rate sensor 23 for measuring the angular velocity of the vehicle 1 about a yaw axis.

Output of the joystick 12 and detection signals of the inclination sensor 22 and the yaw rate sensor 23 are input to the control device 21.

Incidentally, the control device 21 may be formed by a plurality of electronic circuit units capable of communicating with each other.

The inclination sensor 22 is, for example, includes an acceleration sensor and an angular velocity sensor such as a gyro sensor or the like. The control device 21 obtains the measured value of the angle of inclination of the occupant boarding member 5 (in other words, the angle of inclination of the base 2) from detection signals of the acceleration sensor and the angular velocity sensor by using a known method. For example, a method proposed by the present applicant in Japanese Patent No. 4181113, can be adopted.

The angle of inclination of the occupant boarding member 5 (or the angle of inclination of the base 2) in the present embodiment is more specifically an angle of inclination (a set of an angle of inclination in the direction about the X-axis and an angle of inclination in the direction about the Y-axis) when the attitude of the occupant boarding member 5 (or the base 2) in a state in which the center of gravity of the whole including the vehicle 1 and the occupant boarded on the occupant boarding member 5 in a predetermined position (normal position) is situated directly above the grounded part of the first moving operation unit 3 (above in the vertical direction) is set as a reference (zero: 0).

In addition, the yaw rate sensor 23 includes an angular velocity sensor such as a gyro sensor or the like. The control device 21 obtains the measured value of the angular velocity of the vehicle 1 about the yaw axis on the basis of the detection signal of the yaw rate sensor 23.

As functions realized by the implemented program and the like (functions realized by software) or functions configured by hardware, in addition to the functions of obtaining measured values as described above, the control device 21 includes: a first control processing section 24 for controlling the moving operation of the first moving operation unit 3 by controlling the electric motors 8a and 8b of the first actuator device 8; and a second control processing section 25 for controlling the moving operation of the second moving operation unit 4 by controlling the electric motor 17 of the second actuator device. In addition, the first control processing section 24 includes a target turning angular velocity determination processing section 80 for determining the target turning angular velocity of the vehicle 1.

The first control processing section 24 successively calculates a first target velocity as a target value for the moving velocity (specifically a set of a translational velocity in the X-axis direction and a translational velocity in the Y-axis direction) of the first moving operation unit 3 by performing arithmetic processing to be described later, and controls the rotational speeds of the electric motors 8a and 8b so as to make the actual moving velocity of the first moving operation unit 3 coincide with the first target velocity.

In this case, relation between the respective rotational speeds of the electric motors 8a and 8b and the actual moving velocity of the first moving operation unit 3 is determined in advance, and target values for the rotational speeds of the respective electric motors 8a and 8b are specified according to the first target velocity of the first moving operation unit 3. Then, the actual moving velocity of the first moving operation unit 3 is controlled to be the first target velocity by performing feedback control of the rotational speeds of the electric motors 8a and 8b to the target values specified according to the first target velocity.

In addition, the second control processing section 25 successively calculates a second target velocity as a target value for the moving velocity (specifically a translational velocity in the Y-axis direction) of the second moving operation unit 4 by performing arithmetic processing to be described later, and controls the rotational speed of the electric motor 17 so as to make the actual moving velocity of the second moving operation unit 4 in the Y-axis direction coincide with the second target velocity.

As in the case of the first moving operation unit 3, relation between the rotational speed of the electric motor 17 and the actual moving velocity of the second moving operation unit 4 in the Y-axis direction is determined in advance, and a target value for the rotational speed of the electric motor 17 is specified according to the second target velocity of the second moving operation unit 4. Then, the actual moving velocity of the second moving operation unit 4 in the Y-axis direction is controlled to be the second target velocity by performing feedback control of the rotational speed of the electric motor 17 to the target value specified according to the second target velocity.

According to the present embodiment, the second moving operation unit 4 moves in the X-axis direction in a driven manner so as to follow the movement of the first moving operation unit 3 in the X-axis direction. It is therefore not necessary to set a target value for the moving velocity of the second moving operation unit 4 in the X-axis direction.

The processing of the first control processing section 24 and the second control processing section 25 will be described in more detail. The processing of the first control processing section 24 will first be described with reference to FIGS. 4 to 8.

Figure 4:
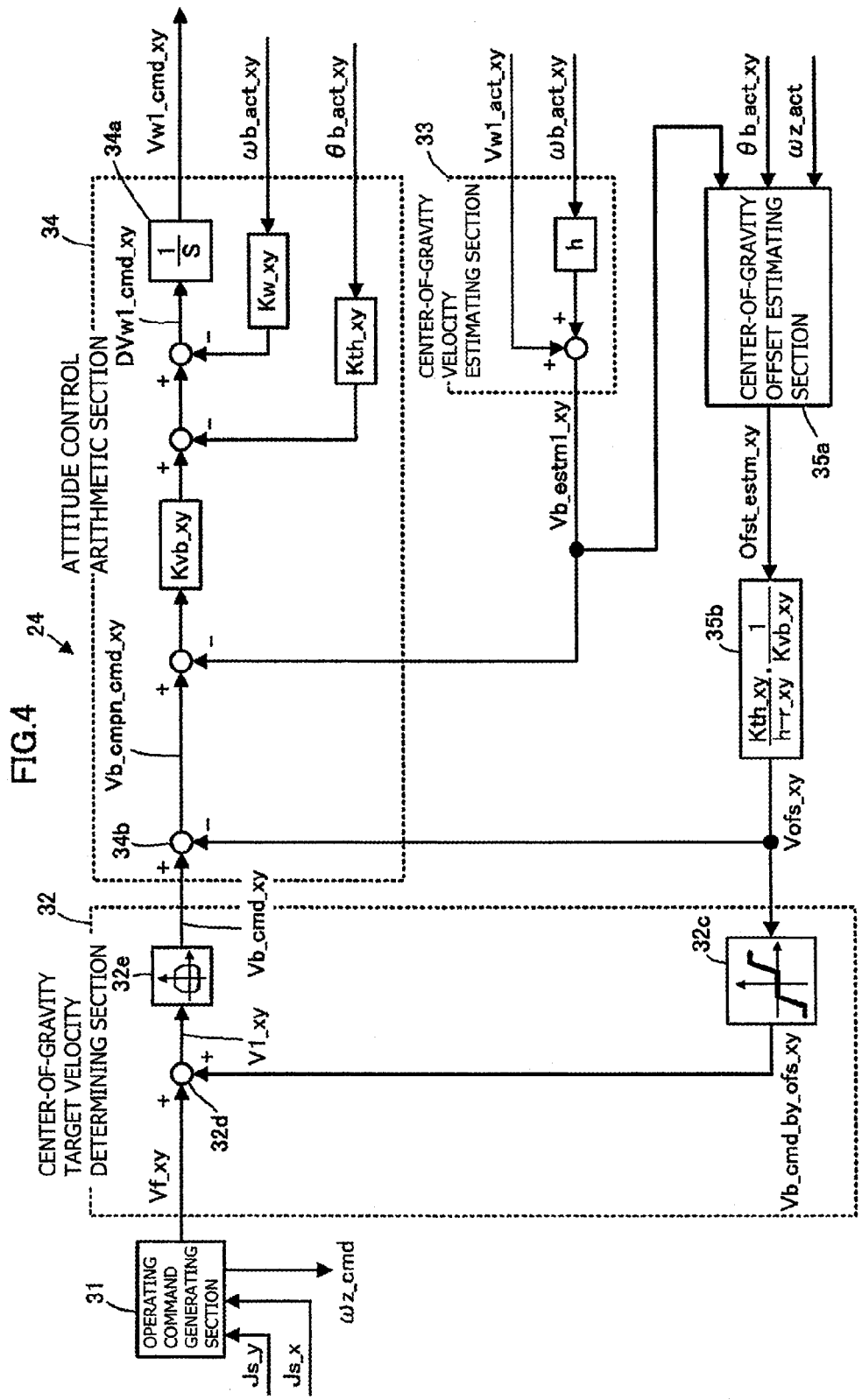
FIG. 4 is a block diagram showing the processing of a first control processing section shown in FIG. 3.

As shown in FIG. 4, as main functional parts of the first control processing section 24, the first control processing section 24 includes: an operating command generating section 31 for converting the target turning angular velocity ωz_cmd output from the target turning angular velocity determination processing section 80 to be described later and the amount of swing (amount of rotation about the Y-axis) Js_x in the forward-rearward direction of the joystick 12 which amount of swing is indicated by the operation signal input from the joystick 12 into a velocity command for moving the vehicle 1; a center-of-gravity target velocity determining section 32 for determining a target velocity for the center of gravity of the whole including the vehicle 1 and the occupant boarded on the occupant boarding member 5 (which center of gravity will hereinafter be referred to as the center of gravity of the whole of a vehicle system); a center-of-gravity velocity estimating section 33 for estimating the velocity of the center of gravity of the whole of the vehicle system; and an attitude control arithmetic section 34 for determining the target value for the moving velocity of the first moving operation unit 3 so as to stabilize the attitude of the occupant boarding member 5 (attitude of the base 2) while making the estimated velocity of the center of gravity of the whole of the vehicle system follow the target velocity. The first control processing section 24 performs the processing of these functional parts in predetermined arithmetic processing cycles of the control device 21.

Incidentally, according to the present embodiment, the center of gravity of the whole of the vehicle system has a meaning as an example of a representative point of the vehicle 1. The velocity of the center of gravity of the whole of the vehicle system therefore means the velocity of translational movement of the representative point.

Before concrete description of the processing of the functional parts of the first control processing section 24, items serving as a basis for the processing will be described in the following.

Figure 5:
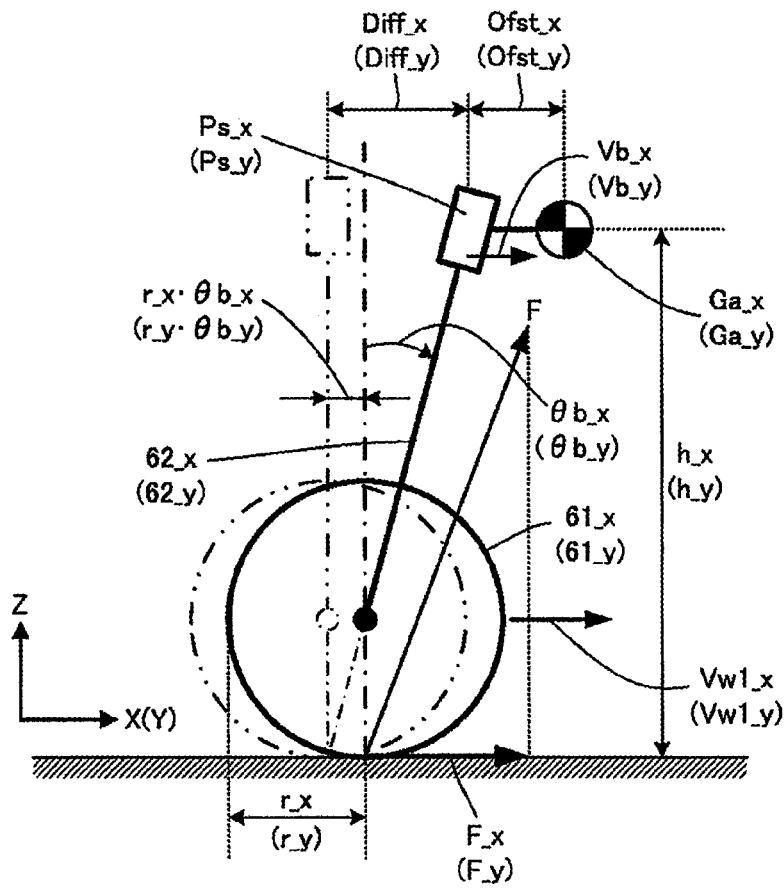
FIG. 5 is a diagram for explaining an inverted pendulum model used for the processing of the first control processing section shown in FIG. 3.

The dynamic behavior of the center of gravity of the whole of the vehicle system (specifically behavior as viewed from the Y-axis direction and behavior as viewed from the X-axis direction) is approximately represented by the behavior of an inverted pendulum model as shown in FIG. 5. An algorithm for the processing of the first control processing section 24 is constructed on the basis of such behavior.

Incidentally, including the reference symbols in FIG. 5, in the following description, a suffix "_x" denotes a reference symbol such as a variable or the like in a case of viewing from the Y-axis direction, and a suffix "_y" denotes a reference symbol such as a variable or the like in a case of viewing from the X-axis direction. In addition, in FIG. 5, in order to show both of an inverted pendulum model as viewed from the Y-axis direction and an inverted pendulum model as viewed from the X-axis direction, the reference symbols of variables in the case of viewing from the Y-axis direction are not parenthesized, but the reference symbols of variables in the case of viewing from the X-axis direction are parenthesized.

The inverted pendulum model representing the behavior of the center of gravity of the whole of the vehicle system as viewed from the Y-axis direction includes: an imaginary wheel 61_x that has an axis of rotation parallel with the Y-axis direction and which is rotatable on the floor surface (which imaginary wheel will hereinafter be referred to as an imaginary wheel 61_x); a rod 62_x that is extended from the center of rotation of the imaginary wheel 61_x and which is swingable about the axis of rotation of the imaginary wheel 61_x (in the direction about the Y-axis); and a mass point Ga_x coupled to a reference part Ps_x as an end part (upper end part) of the rod 62_x.

In the inverted pendulum model, the movement of the mass point Ga_x corresponds to the movement of the center of gravity of the whole of the vehicle system as viewed from the Y-axis direction, and the angle of inclination θb_x of the rod 62_x with respect to the vertical direction (angle of inclination in the direction about the Y-axis) coincides with the angle of inclination of the occupant boarding member 5 (or the base 2) in the direction about the Y-axis. In addition, the translational movement of the first moving operation unit 3 in the X-axis direction corresponds to translational movement in the X-axis direction due to the rotation of the imaginary wheel 61_x.

The radius r_x of the imaginary wheel 61_x and the height h_x of the reference part Ps_x and the mass point Ga_x from the floor surface are a predetermined value (fixed value) set in advance.

Similarly, the inverted pendulum model representing the behavior of the center of gravity of the whole of the vehicle system as viewed from the X-axis direction includes: an imaginary wheel 61_y that has an axis of rotation parallel with the X-axis direction and which is rotatable on the floor surface (which imaginary wheel will hereinafter be referred to as an imaginary wheel 61_y); a rod 62_y that is extended from the center of rotation of the imaginary wheel 61_y and which is swingable about the axis of rotation of the imaginary wheel 61_y (in the direction about the X-axis); and a mass point Ga_y coupled to a reference part Ps_y as an end part (upper end part) of the rod 62_y.

In the inverted pendulum model, the movement of the mass point Ga_y corresponds to the movement of the center of gravity of the whole of the vehicle system as viewed from the X-axis direction, and the angle of inclination θb_y of the rod 62_y with respect to the vertical direction (angle of inclination in the direction about the X-axis) coincides with the angle of inclination of the occupant boarding member 5 (or the base 2) in the direction about the X-axis. In addition, the translational movement of the first moving operation unit 3 in the Y-axis direction corresponds to translational movement in the Y-axis direction due to the rotation of the imaginary wheel 61_y.

The radius r_y of the imaginary wheel 61_y and the height h_y of the reference part Ps_y and the mass point Ga_y from the floor surface are a predetermined value (fixed value) set in advance. Incidentally, the height h_y of the reference part Ps_y and the mass point Ga_y from the floor surface as viewed from the X-axis direction is the same as the height h_x of the reference part Ps_x and the mass point Ga_x from the floor surface as viewed from the Y-axis direction. Accordingly, hereinafter, let h_x=h_y=h.

To supplement the description in regard to positional relation between the reference part Ps_x and the mass point Ga_x as viewed from the Y-axis direction, the position of the reference part Ps_x corresponds to the position of the center of gravity of the whole of the vehicle system in a case where the occupant boarded (seated) on the occupant boarding member 5 remains in a predetermined neutral position with respect to the occupant boarding member 5 and is motionless. Thus, in this case, the position of the mass point Ga_x coincides with the position of the reference part Ps_x. The same is true for positional relation between the reference part Ps_y and the mass point Ga_y as viewed from the X-axis direction.

However, in actuality, when the occupant boarded on the occupant boarding member 5 moves the upper part of the body or the like of the occupant with respect to the occupant boarding member 5 (or the base 2), the position in the X-axis direction and the position in the Y-axis direction of the actual center of gravity of the whole of the vehicle system are generally offset from the positions of the reference parts Ps_x and Ps_y, respectively, in the horizontal direction. Thus, in FIG. 5, the positions of the mass points Ga_x and Ga_y are shown offset from the positions of the reference parts Ps_x and Ps_y, respectively.

The behavior of the center of gravity of the whole of the vehicle system which behavior is represented by the inverted pendulum model is expressed by the following Equations (1a), (1b), (2a), and (2b). In this case, Equations (1a) and (1b) express the behavior as viewed in the Y-axis direction, and Equations (2a) and (2b) express the behavior as viewed in the X-axis direction.

$$Vb\_x = Vw1\_x + h \cdot \omega b\_x \tag{1a}$$

$$dVb\_x/dt = (g/h) \cdot (\theta b\_x \cdot (h - r\_x) + Ofst\_x) + \omega z \cdot Vb\_y \tag{1b}$$

$$Vb\_y = Vw1\_y + h \cdot \omega b\_y \tag{2a}$$

$$dVb\_y/dt = (g/h) \cdot (\theta b\_y \cdot (h - r\_y) + Ofst\_y) - \omega z \cdot Vb\_x \tag{2b}$$

where Vb_x is the velocity (translational velocity) of the center of gravity of the whole of the vehicle system in the X-axis direction; Vw1_x is the moving velocity (translational velocity) of the imaginary wheel 61_x in the X-axis direction; θb_x is the angle of inclination of the occupant boarding member 5 (or the base 2) in the direction about the Y-axis; ωb_x is a temporal change rate of the angle of inclination θb_x (=dθb_x/dt); Ofst_x is an amount of offset in the X-axis direction of the position of the center of gravity of the whole of the vehicle system in the X-axis direction (position of the mass point Ga_x in the X-axis direction) from the position of the reference part Ps_x; Vb_y is the velocity (translational velocity) of the center of gravity of the whole of the vehicle system in the Y-axis direction; Vw1_y is the moving velocity (translational velocity) of the imaginary wheel 61_y in the Y-axis direction; θb_y is the angle of inclination of the occupant boarding member 5 (or the base 2) in the direction about the X-axis; ωb_y is a temporal change rate of the angle of inclination θb_y (=dθb_y/dt); Ofst_y is an amount of offset in the Y-axis direction of the position of the center of gravity of the whole of the vehicle system in the Y-axis direction (position of the mass point Ga_y in the Y-axis direction) from the position of the reference part Ps_y. In addition, ωz is a yaw rate (angular velocity in a direction about the yaw axis) at a time of turning of the vehicle 1, and g is a gravitational acceleration constant. Incidentally, the positive direction of the angle of inclination θb_x and the temporal change rate ωb_x is a direction in which the center of gravity of the whole of the vehicle system inclines in the positive direction of the X-axis (forward direction), and the positive direction of the angle of inclination θb_y and the temporal change rate ωb_y is a direction in which the center of gravity of the whole of the vehicle system inclines in the positive direction of the Y-axis (left direction). In addition, the positive direction of the yaw rate ωz is a counterclockwise direction when the vehicle 1 is viewed from above.

A second term (=h·ωb_x) on the right side of Equation (1a) is a translational velocity component of the reference part Ps_x in the X-axis direction which component is produced by tilting of the occupant boarding member 5 in the direction about the Y-axis. A second term (=h·ωb_y) on the right side of Equation (2a) is a translational velocity component of the reference part Ps_y in the Y-axis direction which component is produced by tilting of the occupant boarding member 5 in the direction about the X-axis.

To supplement the description, Vw1_x in Equation (1a) is specifically the relative circumferential velocity of the imaginary wheel 61_x with respect to the rod 62_x (or with respect to the occupant boarding member 5 or the base 2). Thus, Vw1_x includes not only the moving velocity in the X-axis direction of the grounded point of the imaginary wheel 61_x with respect to the floor surface (moving velocity in the X-axis direction of the grounded point of the first moving operation unit 3 with respect to the floor surface) but also a velocity component (=r_x·ωb_x) attendant on the tilting of the rod 62_x. The same is true for Vw1_y in Equation (1b).

A first term on the right side of Equation (1b) is an acceleration component in the X-axis direction which component is produced at the center of gravity of the whole of the vehicle system by an X-axis direction component (F_x in FIG. 5) of a floor reaction force (F in FIG. 5) acting on the grounded part of the imaginary wheel 61_x according to an amount of offset (=θb_x·(h−r_x)+Ofst_x) of the position of the center of gravity of the whole of the vehicle system in the X-axis direction (position of the mass point Ga_x in the X-axis direction) from a position vertically above the grounded part of the imaginary wheel 61_x grounded part of the first moving operation unit 3 as viewed from the Y-axis direction). A second term on the right side of Equation (1b) is an acceleration component in the X-axis direction which component is produced by a centrifugal force acting on the vehicle 1 at a time of turning at the yaw rate of ωz.

Similarly, a first term on the right side of Equation (2b) is an acceleration component in the Y-axis direction which component is produced at the center of gravity of the whole of the vehicle system by a Y-axis direction component (F_y in FIG. 5) of the floor reaction force (F in FIG. 5) acting on the grounded part of the imaginary wheel 61_y according to an amount of offset (=θb_y·(h−r_y)+Ofst_y) of the position of the center of gravity of the whole of the vehicle system in the Y-axis direction (position of the mass point Ga_y in the Y-axis direction) from a position vertically above the grounded part of the imaginary wheel 61_y (grounded part of the first moving operation unit 3 as viewed from the X-axis direction). A second term on the right side of Equation (2b) is an acceleration component in the Y-axis direction which component is produced by the centrifugal force acting on the vehicle 1 at a time of turning at the yaw rate of ωz.

The behavior expressed by Equations (1a) and (1b) (behavior as viewed in the X-axis direction) as described above is represented as shown in FIG. 6 when expressed in a block diagram. A reference character 1/s in FIG. 6 denotes an integrating operation.

Figure 6:
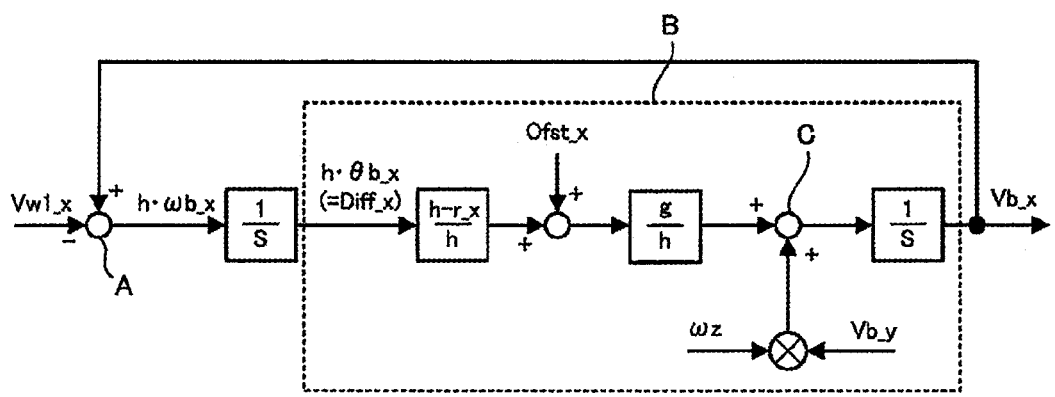
FIG. 6 is a block diagram showing behavior relating to the inverted pendulum model of shown in FIG. 5.

The processing of an arithmetic section with a reference character A in FIG. 6 corresponds to the relational expression of Equation (1a). The processing of an arithmetic section with a reference character B in FIG. 6 corresponds to the relational expression of Equation (1b).

Incidentally, h·θb_x in FIG. 6 approximately equates to Diff_x shown in FIG. 5.

Meanwhile, a block diagram expressing the behavior represented by Equations (2a) and (2b) (behavior as viewed in the Y-axis direction) is obtained by replacing the suffix "_x" in FIG. 6 with "_y" and replacing the sign "+" of the acceleration component on the lower side of FIG. 6 (acceleration component produced by the centrifugal force) as one of inputs to an adder with a reference character C with "−."

In the present embodiment, the algorithm for the processing of the first control processing section 24 is constructed on the basis of the behavior model of the center of gravity of the whole of the vehicle system (inverted pendulum model) in which the amounts of offset of the center of gravity of the whole of the vehicle system from the reference parts Ps_x and Ps_y and the centrifugal force are taken into account as described above.

Based on the above as a premise, more concrete description will be made of the processing of the first control processing section 24. Incidentally, in the following description, a set of the value of a variable relating to the behavior as viewed from the Y-axis direction and the value of a variable relating to the behavior as viewed from the X-axis direction may be expressed with a suffix "_xy" added thereto.

Referring to FIG. 4, the first control processing section 24 first performs the processing of the operating command generating section 31 and the processing of the center-of-gravity velocity estimating section 33 in each arithmetic processing cycle of the control device 21.

Figure 7:
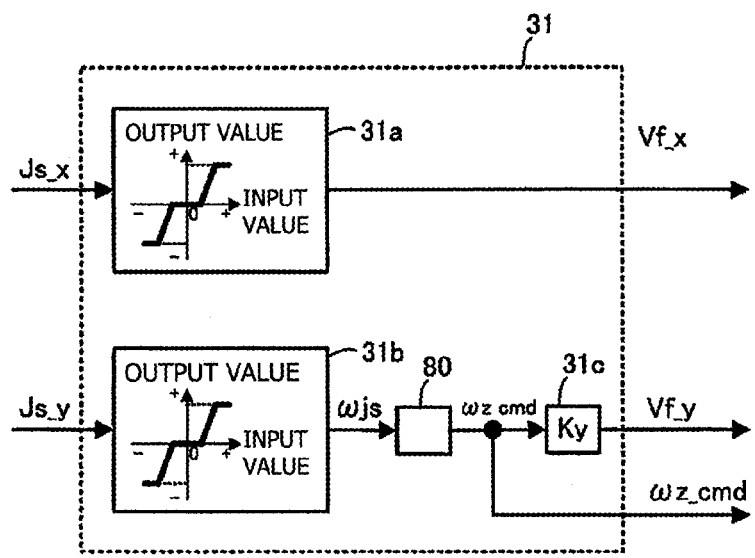
FIG. 7 is a block diagram showing the processing of an operating command generating section shown in FIG. 4.

As shown in FIG. 7, the operating command generating section 31 determines a basic velocity command Vf_xy as a basic command value for the moving velocity (translational velocity) of the first moving operation unit 3 and the target turning angular velocity ωz_cmd as a basic command value for an angular velocity in the direction about the yaw axis at a time of turning of the vehicle 1 according to the amount of swing Js_y in the Y-axis direction (that is, the amount of rotation about the X-axis) of the joystick 12 and the amount of swing Js_x in the X-axis direction (that is, the amount of rotation about the Y-axis) of the joystick 12.

The basic velocity command Vf_x in the X-axis direction of the basic velocity command Vf_xy is determined in a processing section 31a according to the amount of swing Js_x in the X-axis direction of the joystick 12. Specifically, when the amount of swing Js_x is an amount of swing in the positive direction (amount of swing in the forward direction), the basic velocity command Vf_x in the X-axis direction is a velocity command for the forward movement direction of the vehicle 1 (positive velocity command). When the amount of swing Js_x is an amount of swing in the negative direction (amount of swing in the rearward direction), the basic velocity command Vf_x in the X-axis direction is a velocity command for the rearward movement direction of the vehicle 1 (negative velocity command).

In addition, in this case, the magnitude of the basic velocity command Vf_x in the X-axis direction is determined so as to be increased in a range not exceeding a predetermined upper limit value as the magnitude of the amount of swing Js_x in the X-axis direction (the forward direction or the rearward direction) of the joystick 12 is increased.

A predetermined range in which the magnitude of the amount of swing Js_x in the positive direction or the negative direction of the joystick 12 is sufficiently minute may be set as a dead zone, and the basic velocity command Vf_x in the X-axis direction may be set to zero for amounts of swing within the dead zone. A graph shown in the processing section 31a in FIG. 7 shows relation between the input (Js_x) and the output (Vf_x) when the above-described dead zone is provided.

In addition, the basic velocity command Vf_y in the Y-axis direction of the basic velocity command Vf_xy is determined as a velocity command in the Y-axis direction of the first moving operation unit 3 for turning the vehicle 1 according to the amount of swing Js_y in the Y-axis direction of the joystick 12. Specifically, when the amount of swing Js_y is an amount of swing in the negative direction (amount of swing in the right direction), the basic velocity command Vf_y in the Y-axis direction is a velocity command for the left direction of the vehicle 1 (positive velocity command). When the amount of swing Js_y is an amount of swing in the positive direction (amount of swing in the left direction), the basic velocity command Vf_y in the Y-axis direction is a velocity command for the right direction of the vehicle 1 (negative velocity command). In addition, in this case, the magnitude of the basic velocity command Vf_y in the Y-axis direction is determined so as to be increased in a range not exceeding a predetermined upper limit value as the magnitude of the amount of swing in the Y-axis direction (the right direction or the left direction) of the joystick 12 is increased.

More specifically, for example, as shown in FIG. 7, the processing of a processing section 31b determines a basic turning angular velocity command ωjs as a basic command value for the angular velocity in the direction about the yaw axis at a time of turning of the vehicle 1 according to the amount of swing Js_y in the Y-axis direction of the joystick 12. In this case, when the amount of swing Js_y of the joystick 12 is an amount of swing in the negative direction (amount of swing in the right direction), the basic turning angular velocity command ωjs is an angular velocity command for turning clockwise (negative angular velocity command).

When the amount of swing Js_y of the joystick 12 is an amount of swing in the positive direction (amount of swing in the left direction), the basic turning angular velocity command ωjs is an angular velocity command for turning counterclockwise (positive angular velocity command). In this case, the magnitude of the basic turning angular velocity command ωjs is determined so as to be increased in a range not exceeding a predetermined upper limit value as the magnitude of the amount of swing in the Y-axis direction of the joystick 12 is increased.

However, as for the magnitude of the basic turning angular velocity command ωjs, a predetermined range in which the magnitude of the amount of swing in the Y-axis direction of the joystick 12 is sufficiently minute may be set as a dead zone, and the basic turning angular velocity command ωjs may be set to zero for amounts of swing within the dead zone. A graph shown in the processing section 31b in FIG. 7 shows relation between the input (Js_y) and the output (ωjs) when the above-described dead zone is provided.

The target turning angular velocity determination processing section 80 to be described later next determines the target turning angular velocity ωz_cmd from the basic turning angular velocity command ωjs. Incidentally, usually, "ωz_cmd=ωjs."

A processing section 31c determines the basic velocity command Vf_y in the Y-axis direction of the first moving operation unit 3 by multiplying the target turning angular velocity ωz_cmd by a negative value Ky obtained by multiplying a predetermined value (>0) determined in advance as a distance in the X-axis direction between the instantaneous turning center of the vehicle 1 and the grounded point of the first moving operation unit 3 by (−1).

The basic velocity command Vf_y in the Y-axis direction of the first moving operation unit 3 is therefore determined so as to be proportional to the target turning angular velocity ωz_cmd.

The center-of-gravity velocity estimating section 33 calculates the estimated value Vb_estm1_xy of the velocity of the center of gravity of the whole of the vehicle system on the basis of geometric (kinematic) relational expressions shown in the above-described Equations (1a) and (2a) in the inverted pendulum model.

Specifically, as shown in the block diagram of FIG. 4, the estimated value Vb_estm1_xy of the velocity of the center of gravity of the whole of the vehicle system is calculated by adding together the value of actual translational velocity Vw1_act_xy of the first moving operation unit 3 and a value obtained by multiplying the actual temporal change rate (inclination angular velocity) ωb_act_xy of the angle of inclination θb_xy of the occupant boarding member 5 by the height h of the center of gravity of the whole of the vehicle system.

That is, the estimated value Vb_estm1_x of the velocity in the X-axis direction of the center of gravity of the whole of the vehicle system and the estimated value Vb_estm1_y of the velocity in the Y-axis direction of the center of gravity of the whole of the vehicle system are calculated by the following Equations (3a) and (3b), respectively.

$$Vb\_estm1\_x = Vw1\_act\_x + h \cdot \omega b\_act\_x \quad (3a)$$

$$Vb\_estm1\_y = Vw1\_act\_y + h \cdot \omega b\_act\_y \quad (3b)$$

However, the temporal change rate of the amount of offset Ofst_xy of the position of the center of gravity of the whole of the vehicle system from the position of the reference part Ps_xy (which amount of offset will hereinafter be referred to as an amount of offset Ofst_xy of the center of gravity) is assumed to be sufficiently low and negligible as compared with the estimated value Vb_estm1_xy.

In this case, used as the values of Vw1_act_x and Vw1_act_y in the above operation in the present embodiment are target values Vw1_cmd_x and Vw1_cmd_y (previous values) of the moving velocity of the first moving operation unit 3 which target values are determined by the attitude control arithmetic section 34 in a previous arithmetic processing cycle.

However, for example, the respective rotational speeds of the electric motors 8a and 8b may be detected by a rotational speed sensor such as a rotary encoder or the like, and the latest values of Vw1_act_x and Vw1_act_y estimated from the detected values of these rotational speeds (in other words, the latest values of measured values of Vw1_act_x and Vw1_act_y) may be used for the operations of Equations (3a) and (3b).

In addition, used as the values of ωb_act_x and ωb_act_y in the present embodiment is the latest value of the temporal change rate of the measured value of the angle of inclination θb of the occupant boarding member 5 on the basis of the detection signal of the inclination sensor 22 (in other words, the latest values of measured values of ωb_act_x and ωb_act_y).

After performing the processing of the operating command generating section 31 and the center-of-gravity velocity estimating section 33 as described above, the first control processing section 24 next determines a center-of-gravity offset amount estimated value Ofst_estm_xy as the estimated value of the amount of offset Ofst_xy of the center of gravity by performing the processing of a center-of-gravity offset estimating section 35a shown in FIG. 4.

Figure 8:
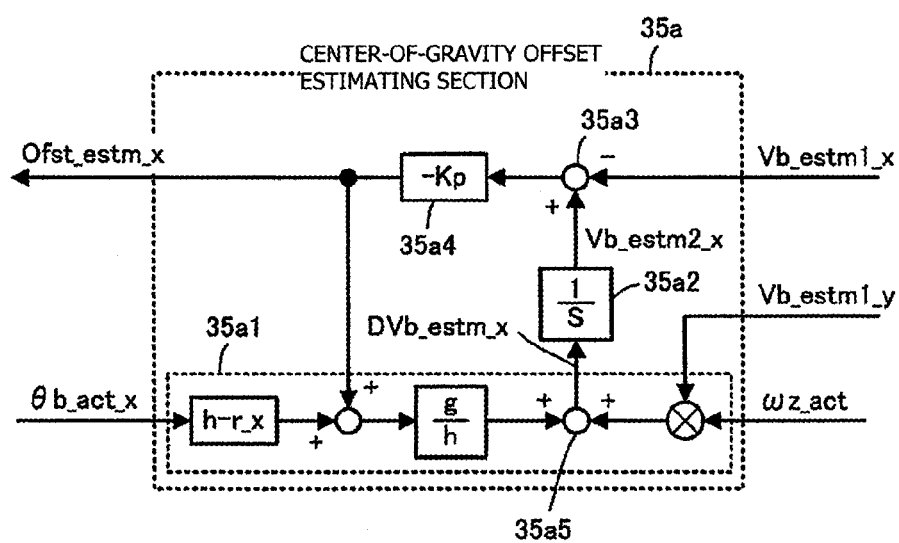
FIG. 8 is a block diagram showing the processing of a center-of-gravity offset estimating section shown in FIG. 4.

The processing of the center-of-gravity offset estimating section 35a is processing shown by a block diagram of FIG. 8. FIG. 8 representatively shows a process of determining the center-of-gravity offset amount estimated value Ofst_estm_x in the X-axis direction of the center-of-gravity offset amount estimated value Ofst_estm_xy.

Describing the processing of FIG. 8 concretely, the center-of-gravity offset estimating section 35a calculates the estimated value DVb_estm_x of translational acceleration in the X-axis direction of the center of gravity of the whole of the vehicle system by performing the arithmetic processing on the right side of the above-described Equation (1b) in an arithmetic section 35a1 using the measured value (latest value) of the actual angle of inclination θb_act_x in the direction about the Y-axis of the occupant boarding member 5 which measured value is obtained from the detection signal of the inclination sensor 22, the measured value (latest value) of the actual yaw rate ωz_act of the vehicle 1 which measured value is obtained from the detection signal of the yaw rate sensor 23, the first estimated value Vb_estm1_y (latest value) of the velocity in the Y-axis direction of the center of gravity of the whole of the vehicle system which estimated value is calculated by the center-of-gravity velocity estimating section 33, and the center-of-gravity offset amount estimated value Ofst_estm_x (previous value) in the X-axis direction which estimated value is determined in a previous arithmetic processing cycle.

The center-of-gravity offset estimating section 35a further calculates the second estimated value Vb_estm2_x of the velocity in the X-axis direction of the center of gravity of the whole of the vehicle system by performing a process of integrating the estimated value DVb_estm_x of translational acceleration in the X-axis direction of the center of gravity of the whole of the vehicle system in an arithmetic section 35a2.

The center-of-gravity offset estimating section 35a next performs a process of calculating a deviation between the second estimated value Vb_estm2_x (latest value) of the velocity in the X-axis direction of the center of gravity of the whole of the vehicle system and the first estimated value Vb_estm1_x (latest value) of the velocity in the X-axis direction of the center of gravity of the whole of the vehicle system in an arithmetic section 35a3.

The center-of-gravity offset estimating section 35a further determines the latest value of the center-of-gravity offset amount estimated value Ofst_estm_x in the X-axis direction by performing a process of multiplying the deviation by a gain (−Kp) of a predetermined value in an arithmetic section 35a4.

A process of determining the center-of-gravity offset amount estimated value Ofst_estm_y in the Y-axis direction is performed in a similar manner to the above. Specifically, a block diagram showing the determining process is obtained by replacing the suffix "_x" in FIG. 8 with "_y" and replacing the sign "+" of a acceleration component on the right side of FIG. 8 (acceleration component produced by the centrifugal force) as one of inputs to an adder 35a5 with "−."

The center-of-gravity offset amount estimated value Ofst_estm_xy is determined while successively updated by such processing of the center-of-gravity offset estimating section 35a. Thereby the center-of-gravity offset amount estimated value Ofst_estm_xy can be determined so as to converge to the actual value.

The first control processing section 24 next calculates a center-of-gravity offset effect amount Vofs_xy by performing the processing of a center-of-gravity offset effect amount calculating section 35b shown in FIG. 4.

The center-of-gravity offset effect amount Vofs_xy represents the offset of an actual center-of-gravity velocity with respect to the target velocity of the center of gravity of the whole of the vehicle system when feedback control is performed without consideration being given to the offset of the position of the center of gravity of the whole of the vehicle system from the position of the reference part Ps_xy in the inverted pendulum model in the attitude control arithmetic section 34 to be described later.

Specifically, the center-of-gravity offset effect amount calculating section 35*b* calculates the center-of-gravity offset effect amount Vofs_xy by multiplying a value of (Kth_xy/(h−r_xy))/Kvb_xy by each component of the newly determined center-of-gravity offset amount estimated value Ofst_estm_xy.

Incidentally, Kth_xy is a gain value for determining an operation amount component functioning so as to bring the angle of inclination of the occupant boarding member 5 close to zero (target angle of inclination) in the processing of the attitude control arithmetic section 34 to be described later. Kvb_xy is a gain value for determining an operation amount component functioning so as to bring a deviation between the target velocity Vb_cmd_xy of the center of gravity of the whole of the vehicle system and the first estimated value Vb_estm1_xy of the velocity of the center of gravity of the whole of the vehicle system close to zero in the processing of the attitude control arithmetic section 34 to be described later.

The first control processing section 24 next calculates an after-limitation center-of-gravity target velocity Vb_cmd_xy on the basis of the basic velocity command Vf_xy determined by the operating command generating section 31 and the center-of-gravity offset effect amount Vofs_xy determined by the center-of-gravity offset effect amount calculating section 35*b* by performing the processing of the center-of-gravity target velocity determining section 32 shown in FIG. 4.

The center-of-gravity target velocity determining section 32 first performs the processing of a processing section 32*c* shown in FIG. 4. The processing section 32*c* determines a target center-of-gravity velocity addition amount Vb_cmd_by_ofs_xy as a component corresponding to a center-of-gravity offset among the target values of the center of gravity of the whole of the vehicle system by performing dead zone processing and limit processing for the value of the center-of-gravity offset effect amount Vofs_xy.

Specifically, in the present embodiment, the center-of-gravity target velocity determining section 32 sets the target center-of-gravity velocity addition amount Vb_cmd_by_ofs_x in the X-axis direction to zero when the magnitude of the center-of-gravity offset effect amount Vofs_x in the X-axis direction is a value within a dead zone as a predetermined range in a region of zero (a value relatively close to zero).

In addition, when the magnitude of the center-of-gravity offset effect amount Vofs_x in the X-axis direction is a value deviating from within the dead zone, the center-of-gravity target velocity determining section 32 determines the target center-of-gravity velocity addition amount Vb_cmd_by_ofs_x in the X-axis direction so as to have the same polarity as the center-of-gravity offset effect amount Vofs_x and increase in magnitude as the magnitude of the center-of-gravity offset effect amount Vofs_x is increased. However, the value of the target center-of-gravity velocity addition amount Vb_cmd_by_ofs_x is limited to within a range between a predetermined upper limit value (>0) and a predetermined lower limit value (≤0).

A process of determining the target center-of-gravity velocity addition amount Vb_cmd_by_ofs_y in the Y-axis direction is similar to the above.

The center-of-gravity target velocity determining section 32 next performs a process of determining a target velocity V1_xy, which is obtained by adding the components of the target center-of-gravity velocity addition amount Vb_cmd_by_ofs_xy to the respective components of the basic velocity command Vf_xy determined by the operating command generating section 31 in a processing section 32*d* shown in FIG. 4. That is, the target velocity V1_xy (set of V1_x and V1_y) is determined by the processing of V1_x=Vf_x+Vb_cmd_by_ofs_x and V1_y=Vf_y+Vb_cmd_by_ofs_y.

The center-of-gravity target velocity determining section 32 further performs the processing of a processing section 32*e*. The processing section 32*e* performs limit processing that determines the after-limitation center-of-gravity target velocity Vb_cmd_xy (set of Vb_cmd_x and Vb_cmd_y) as the target velocity of the center of gravity of the whole of the vehicle system, the after-limitation center-of-gravity target velocity Vb_cmd_xy being obtained by limiting the combination of the target velocities V1_x and V1_y, in order to prevent the respective rotational speeds of the electric motors 8*a* and 8*b* as the first actuator device 8 of the first moving operation unit 3 from deviating from a predetermined allowable range.

In this case, when the set of the target velocities V1_x and V1_y obtained by the processing section 32*d* is present within a predetermined region (for example a region in the shape of an octagon) on a coordinate system in which an axis of ordinates indicates the value of the target velocity V1_x and an axis of abscissas indicates the value of the target velocity V1_y, the target velocity V1_xy is determined as the after-limitation center-of-gravity target velocity Vb_cmd_xy as it is.

When the set of the target velocities V1_x and V1_y obtained by the processing section 32*d* deviates from the predetermined region on the coordinate system, the target velocity V1_xy limited to a set on a boundary of the predetermined region is determined as the after-limitation center-of-gravity target velocity Vb_cmd_xy.

As described above, the center-of-gravity target velocity Vb_cmd_xy is determined on the basis of the basic velocity command Vf_xy and the center-of-gravity offset effect amount Vofs_xy (or the center-of-gravity offset). The occupant can therefore steer the vehicle 1 by operation of the operating device (operation of the joystick 12) and changes in the attitude of the body of the occupant (movement of body weight).

After performing the processing of the center-of-gravity target velocity determining section 32 as described above, the first control processing section 24 next performs the processing of the attitude control arithmetic section 34. The attitude control arithmetic section 34 determines a first target velocity Vw1_cmd_xy as a target value for the moving velocity (translational velocity) of the first moving operation unit 3 by processing shown in the block diagram of FIG. 4.

More specifically, the attitude control arithmetic section 34 first determines a target velocity Vb_cmpn_cmd_xy (latest value) after center-of-gravity offset compensation by performing a process of subtracting the components of the center-of-gravity offset effect amount Vofs_xy from the respective components of the after-limitation center-of-gravity target velocity Vb_cmd_xy in an arithmetic section 34*b*.

The attitude control arithmetic section 34 next calculates a target translational acceleration DVw1_cmd_x in the X-axis direction and a target translational acceleration DVw1_cmd_y in the Y-axis direction of a target translational acceleration DVw1_cmd_xy as a target value for the translational acceleration of the grounded part of the first moving operation unit 3 by the processing of the above-described arithmetic section 34*b* and an arithmetic section excluding an integrating arithmetic section 34*a* for performing integrating operation, by the operations of the following Equations (4a) and (4b).

$$DVw1\_cmd\_x = Kvb\_x \cdot (Vb\_cmpn\_cmd\_x - Vb\_estm1\_x) - Kth\_x \cdot \theta b\_act\_x - Kw\_x \cdot \omega b\_act\_x \quad (4a)$$

$$DVw1\_cmd\_y = Kvb\_y \cdot (Vb\_cmpn\_cmd\_y - Vb\_estm1\_y) - Kth\_y \cdot \theta b\_act\_y - Kw\_y \cdot \omega b\_act\_y \quad (4b)$$

Kvb_xy, Kth_xy, and Kw_xy in Equations (4a) and (4b) are a predetermined gain value set in advance.

In addition, a first term on the right side of Equation (4a) is a feedback operation amount component corresponding to a deviation between the target velocity Vb_cmpn_cmd_x (latest value) after center-of-gravity offset compensation in the X-axis direction of the center of gravity of the whole of the vehicle system and the first estimated value Vb_estm1_x (latest value). A second term on the right side of Equation (4a) is a feedback operation amount component corresponding to the measured value (latest value) of the actual angle of inclination θb_act_x in the direction about the Y-axis of the occupant boarding member 5.

A third term on the right side of Equation (4a) is a feedback operation amount component corresponding to the measured value (latest value) of the actual inclination angular velocity ωb_act_x in the direction about the Y-axis of the occupant boarding member 5. The target translational acceleration DVw1_cmd_x in the X-axis direction is calculated as a composite operation amount of these feedback operation amount components.

Similarly, a first term on the right side of Equation (4b) is a feedback operation amount component corresponding to a deviation between the target velocity Vb_cmpn_cmd_y (latest value) after center-of-gravity offset compensation in the Y-axis direction of the center of gravity of the whole of the vehicle system and the first estimated value Vb_estm1_y (latest value).

A second term on the right side of Equation (4b) is a feedback operation amount component corresponding to the measured value (latest value) of the actual angle of inclination θb_act_y in the direction about the X-axis of the occupant boarding member 5. A third term on the right side of Equation (4b) is a feedback operation amount component corresponding to the measured value (latest value) of the actual inclination angular velocity ωb_act_y in the direction about the X-axis of the occupant boarding member 5. The target translational acceleration DVw1_cmd_y in the Y-axis direction is calculated as a composite operation amount of these feedback operation amount components.

The attitude control arithmetic section 34 next determines the first target velocity Vw1_cmd_xy (latest value) of the first moving operation unit 3 by integrating each component of the target translational acceleration DVw1_cmd_xy by the integrating arithmetic section 34a.

The first control processing section 24 then controls the electric motors 8a and 8b as the first actuator device 8 of the first moving operation unit 3 according to the first target velocity Vw1_cmd_xy determined as described above. More specifically, the first control processing section 24 determines current command values for the respective electric motors 8a and 8b by feedback control processing so as to make the actual rotational speeds (measured values) of the respective electric motors 8a and 8b follow the target values for the rotational speeds of the respective electric motors 8a and 8b which target values are defined by the first target velocity Vw1_cmd_xy, and passes currents through the respective electric motors 8a and 8b according to the current command values.

With the above-described processing, in a state in which the after-limitation center-of-gravity target velocity Vb_cmd_xy is a constant value, the movement of the vehicle 1 is stabilized, and the vehicle 1 moves in a straight line at a constant speed, the center of gravity of the whole of the vehicle system is present directly above the grounded point of the first moving operation unit 3. In this state, the actual angle of inclination θb_act_xy of the occupant boarding member 5 is −Ofst_xy/(h−r_xy) from Equations (1b) and (2b). In addition, the actual inclination angular velocity ωb_act_xy of the occupant boarding member 5 is zero, and the target translational acceleration DVw1_cmd_xy is zero. From this and the block diagram of FIG. 4, a fact that the estimated value Vb_estm1_xy and the target velocity Vb_cmd_xy coincide with each other is derived.

In other words, the first target velocity Vw1_cmd_xy of the first moving operation unit 3 is basically determined so as to converge the deviation between the after-limitation center-of-gravity target velocity Vb_cmd_xy of the center of gravity of the whole of the vehicle system and the first estimated value Vb_estm1_xy to zero.

In addition, the respective rotational speeds of the electric motors 8a and 8b as the first actuator device 8 of the first moving operation unit 3 are controlled so as not to deviate from the predetermined allowable range by the processing of the processing section 32e while compensation is made for the effect of the offset of the position of the center of gravity of the whole of the vehicle system from the position of the reference part Ps_xy in the inverted pendulum model.

The above is details of the processing of the first control processing section 24 in the present embodiment.

The processing of the second control processing section 25 will next be described with reference to FIG. 9.

Giving an outline of the processing of the second control processing section 25, in conditions in which the target turning angular velocity ωz_cmd determined by the operating command generating section 31 is zero, the second control processing section 25 determines a second target velocity Vw2_cmd_y as a target value for the moving velocity (translational velocity) in the Y-axis direction of the second moving operation unit 4 so as to coincide with the first target velocity Vw1_cmd_y in the Y-axis direction of the first moving operation unit 3 in order to make the translational movement of the vehicle 1 performed.

In addition, in conditions in which the target turning angular velocity ωz_cmd is not zero, the second control processing section 25 determines the second target velocity Vw2_cmd_y in the Y-axis direction of the second moving operation unit 4 so as to be different from the first target velocity Vw1_cmd_y in the Y-axis direction of the first moving operation unit 3 in order to make the turning of the vehicle 1 performed.

Specifically, such processing of the second control processing section 25 is performed as follows. Referring to FIG. 9, the second control processing section 25 first performs the processing of an arithmetic section 42. The arithmetic section 42 determines a basic relative velocity command Vf2_y as a command value for the relative velocity in the Y-axis direction of the second moving operation unit 4 with respect to the first moving operation unit 3 to make the turning of the vehicle 1 performed at the angular velocity of the target turning angular velocity ωz_cmd, by multiplying the target turning angular velocity ωz_cmd by a value obtained by multiplying a distance L (predetermined value) in the X-axis direction between the first moving operation unit 3 and the second moving operation unit 4 by a value of "−1."

The second control processing section 25 next determines the second target velocity Vw2_cmd_y in the Y-axis direction of the second moving operation unit 4 by performing a process of adding the basic relative velocity command Vf2_y (latest value) to the first target velocity Vw1_cmd_y (latest value) in the Y-axis direction of the first moving operation unit 3, the first target velocity Vw1_cmd_y being determined by the first control processing section 24, in an arithmetic section 43.

Figure 9:
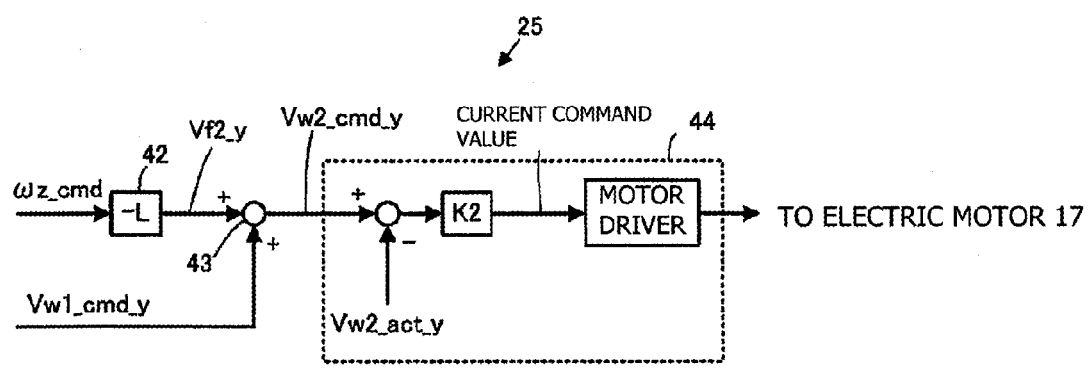
FIG. 9 is a block diagram showing the processing of a second control processing section shown in FIG. 3.

As shown in an arithmetic section 44 in FIG. 9, the second control processing section 25 next controls the current of the electric motor 17 as the second actuator device (in turn the driving force of the second moving operation unit 4) such that a present actual moving velocity Vw2_act_y in the Y-axis direction of the second moving operation unit 4 follows the second target velocity Vw2_cmd_y (latest value).

Specifically, a current command value Iw2_cmd for the electric motor 17 is determined by the operation of the following Equation (5), and further the actual current of the electric motor 17 is controlled to the current command value Iw2_cmd by a motor driver.

$$Iw2\_cmd = K2 \cdot (Vw2\_cmd\_y - Vw2\_act\_y) \quad (5)$$

K2 in Equation (5) is a predetermined gain value set in advance.

In addition, used as the value of the present actual moving velocity Vw2_act_y in the present embodiment is a value estimated from the detected value of the rotational speed of the electric motor 17 (detected value detected by a rotational speed sensor such as a rotary encoder or the like not shown in the figures).

Incidentally, a deviation between the target value for the rotational speed of the electric motor 17 which target value is defined by the second target velocity Vw2_cmd_y and the measured value of the rotational speed may be used in place of Vw2_cmd_y−Vw2_act_y in Equation (5).

As a result of the above control processing of the second control processing section 25, in conditions in which the target turning angular velocity ωz_cmd output from the target turning angular velocity determination processing section 80 is zero, the second target velocity Vw2_cmd_y is determined so as to coincide with the first target velocity Vw1_cmd_y (latest value) in the Y-axis direction of the first moving operation unit 3.

In addition, in conditions in which the target turning angular velocity ωz_cmd output from the target turning angular velocity determination processing section 80 is not zero, the second target velocity Vw2_cmd_y is determined to be a value obtained by adding the basic relative velocity command Vf2_y (latest value) determined according to the target turning angular velocity ωz_cmd to the first target velocity Vw1_cmd_y (latest value) in the Y-axis direction of the first moving operation unit 3. That is, the second target velocity Vw2_cmd_y is determined so as to coincide with Vw1_cmd_y+Vf2_y.

The second target velocity Vw2_cmd_y is therefore determined to be a velocity value different from the first target velocity Vw1_cmd_y in the Y-axis direction of the first moving operation unit 3 to turn the vehicle 1.

More specifically, when a turning command from the joystick 12 is a command to turn the vehicle 1 to the right (in the clockwise direction) (when the basic turning angular velocity command ωjs represents an angular velocity in the clockwise direction), the basic relative velocity command Vf2_y represents a velocity in the left direction.

At this time, when the first target velocity Vw1_cmd_y in the Y-axis direction of the first moving operation unit 3 is a velocity in the left direction, the second target velocity Vw2_cmd_y in the Y-axis direction of the second moving operation unit 4 is a velocity in the left direction and of a magnitude larger than that of the first target velocity Vw1_cmd_y (that is, the vehicle 1 is controlled so as to turn about a point in front of the grounded point of the first moving operation unit 3 in a present control cycle).

In addition, when the turning command from the joystick 12 is a command to turn the vehicle 1 to the right (clockwise direction), and the first target velocity Vw1_cmd_y in the Y-axis direction of the first moving operation unit 3 is a velocity in the right direction, the second target velocity Vw2_cmd_y in the Y-axis direction of the second moving operation unit 4 is a velocity in the right direction and of a magnitude smaller than that of the first target velocity Vw1_cmd_y (that is, when the second target velocity Vw2_cmd_y is not zero, the vehicle 1 is controlled to turn about a point in the rear of the second moving operation unit 4 in the present control cycle, and when the second target velocity Vw2_cmd_y is zero, the vehicle 1 is controlled to turn about the grounded point of the second moving operation unit 4 in the present control cycle), or a velocity in an opposite direction (left direction) from the first target velocity Vw1_cmd_y (that is, the vehicle 1 is controlled to turn about a point between the grounded point of the first moving operation unit 3 and the grounded point of the second moving operation unit 4 in the present control cycle).

In addition, when the target turning angular velocity ωz_cmd is an angular velocity for turning the vehicle 1 to the right (clockwise direction), and the first target velocity Vw1_cmd_y in the Y-axis direction of the first moving operation unit 3 is zero, the second target velocity Vw2_cmd_y in the Y-axis direction of the second moving operation unit 4 is a velocity in the left direction (that is, the vehicle 1 is controlled to turn about the grounded point of the first moving operation unit 3 in the present control cycle).

On the other hand, when the turning command from the joystick 12 is a command to turn the vehicle 1 to the left (in the counterclockwise direction) (when the basic turning angular velocity command ωjs represents an angular velocity in the counterclockwise direction), the basic relative velocity command Vf2_y represents a velocity in the right direction.

At this time, when the first target velocity Vw1_cmd_y in the Y-axis direction of the first moving operation unit 3 is a velocity in the right direction, the second target velocity Vw2_cmd_y in the Y-axis direction of the second moving operation unit 4 is a velocity in the right direction and of a magnitude larger than that of the first target velocity Vw1_cmd_y (that is, the vehicle 1 is controlled so as to turn about a point in front of the first moving operation unit 3 in the present control cycle).

In addition, when the turning command from the joystick 12 is a command to turn the vehicle 1 to the left (counterclockwise direction), and the first target velocity Vw1_cmd_y in the Y-axis direction of the first moving operation unit 3 is a velocity in the left direction, the second target velocity Vw2_cmd_y in the Y-axis direction of the second moving operation unit 4 is a velocity in the left direction and of a magnitude smaller than that of the first target velocity Vw1_cmd_y (that is, when the second target velocity Vw2_cmd_y is not zero, the vehicle 1 is controlled to turn about a point in the rear of the second moving operation unit 4 in the present control cycle, and when the second target velocity Vw2_cmd_y is zero, the vehicle 1 is controlled to turn about the grounded point of the second moving operation unit 4 in the present control cycle), or a velocity in an opposite direction (right direction) from the first target velocity Vw1_cmd_y (that is, the vehicle 1 is controlled to turn about a point between the grounded point of the first moving operation unit 3 and the grounded point of the second moving operation unit 4 in the present control cycle).

In addition, when the target turning angular velocity ωz_cmd is an angular velocity for turning the vehicle 1 to the left (counterclockwise direction), and the first target velocity Vw1_cmd_y in the Y-axis direction of the first moving operation unit 3 is zero, the second target velocity Vw2_cmd_y in the Y-axis direction of the second moving operation unit 4 is a velocity in the right direction (that is, the vehicle 1 is controlled to turn about the grounded point of the first moving operation unit 3 in the present control cycle).

The above is details of the processing of the second control processing section 25.

Incidentally, when the vehicle 1 is controlled to be turned, the point about which to turn the vehicle 1 is set appropriately depending on various factors such as a purpose for which the vehicle 1 is used, conditions of the vehicle 1 (for example the actual angle of inclination θb_act_xy), or the like.

The settings as described above such that the "Y-axis component of the first target velocity Vw1_cmd_xy" and the "Y-axis component of the second target velocity Vw2_cmd_xy" are velocities different from each other when the control device 21 controls the vehicle 1 so as to turn the vehicle 1 correspond to a setting such that "the second moving operation unit has a velocity different from the first moving operation unit in the left-right direction" in the present invention. Incidentally, "the second moving operation unit has a velocity different from the first moving operation unit in the left-right direction" even when one of the velocity of the first moving operation unit in the left-right direction (Y-axis component of the first target velocity Vw1_cmd_xy) and the velocity of the second moving operation unit in the left-right direction (Y-axis component of the second target velocity Vw2_cmd_xy) is zero.

The target turning angular velocity determination processing section 80 of the control device 21 will next be described with reference to FIG. 10.

The target turning angular velocity determination processing section 80 is supplied with the yaw rate ωz_act, the previous value Vw1_cmd_x(k−1) of the first target velocity in the X-axis direction of the first moving operation unit 3 (which first target velocity will hereinafter be referred to as an "X-axis first target velocity"), and the basic turning angular velocity command ωjs. In addition, the target turning angular velocity determination processing section 80 outputs the target turning angular velocity ωz_cmd on the basis of the above inputs.

In this case, the yaw rate ωz_act is the latest value of the measured value of the actual yaw rate of the vehicle 1 about the yaw axis which value is obtained from the detection signal of the yaw rate sensor 23. Incidentally, in the present embodiment, when the yaw rate ωz_act is a positive value, the turning direction of the vehicle 1 is a clockwise direction, and when the yaw rate ωz_act is a negative value, the turning direction of the vehicle 1 is a counterclockwise direction.

The basic turning angular velocity command ωjs represents an angular velocity determined by the control device 21 according to an operation signal indicating an amount of swing in the left-right direction of the joystick 12 and the direction of the swing (the right direction or the left direction). When the amount of swing of the joystick 12 is an amount of swing in the right direction of the vehicle 1 (amount of swing for turning clockwise), the control device 21 sets the basic turning angular velocity command ωjs such that the basic turning angular velocity command ωjs represents an angular velocity having a magnitude corresponding to the amount of swing and making the vehicle 1 turn clockwise.

When the amount of swing of the joystick 12 is an amount of swing in the left direction of the vehicle 1 (amount of swing for turning counterclockwise), the control device 21 sets the basic turning angular velocity command ωjs such that the basic turning angular velocity command ωjs represents an angular velocity having a magnitude corresponding to the amount of swing and making the vehicle 1 turn counterclockwise. In this case, the magnitude of the basic turning angular velocity command ωjs is determined so as to be increased in a range not exceeding a predetermined upper limit value as the amount of swing in the right direction or the left direction of the joystick 12 is increased.

A predetermined range in which the amount of swing in the right direction or the left direction of the joystick 12 is sufficiently minute may be set as a dead zone, and the basic turning angular velocity command ωjs may be set to zero for amounts of swing within the dead zone.

The target turning angular velocity determination processing section 80 first subjects the input yaw rate ωz_act to low-pass filter processing 81 whose transfer function is expressed by "1/(1+Ts)." The target turning angular velocity determination processing section 80 then subjects the yaw rate ωz_act from which a noise component is removed as a result of the low-pass filter processing 81 (which yaw rate ωz_act will hereinafter be referred to as a "yaw rate ωz_act_filt") to gain multiplication processing 82, which multiplies the yaw rate ωz_act_filt by a gain constant K determined in advance. The target turning angular velocity determination processing section 80 subjects the result to first filter processing 83.

The first filter processing 83 outputs zero when the absolute value of the value input to the processing 83 (output value of the gain multiplication processing 82) is "less than a predetermined lower limit value I1 determined in advance," outputs a predetermined output upper limit value O1 when the absolute value of the value input to the processing 83 (output value of the gain multiplication processing 82) "exceeds a predetermined upper limit value I2 determined in advance," and outputs a value that is increased as the input value increases when the absolute value of the value input to the processing 83 (output value of the gain multiplication processing 82) is "equal to or more than the lower limit value I1 and equal to or less than the upper limit value I2."

The target turning angular velocity determination processing section 80 then subjects the output of the first filter processing 83 to second filter processing 84. In the second filter processing 84, the previous value Vw1_cmd_x(k−1) of the X-axis first target velocity is input together with the output value of the first filter processing 83. Incidentally, the previous value Vw1_cmd_x(k−1) of the X-axis first target velocity means traveling in the forward movement direction of the vehicle 1 when the magnitude of the value Vw1_cmd_x(k−1) is a positive value, and the previous value Vw1_cmd_x(k−1) of the X-axis first target velocity means traveling in the rearward movement direction of the vehicle 1 when the magnitude of the value Vw1_cmd_x(k−1) is a negative value.

The second filter processing 84 outputs, as a basic target angular velocity ωz_cmda, a result of multiplying the "output value from the first filter processing 83" which value is input to the second filter processing 84 by an input-to-output ratio set according to the previous value Vw1_cmd_x(k−1) of the X-axis first target velocity.

The second filter processing 84 sets the input-to-output ratio of the output to the input value to zero when the absolute value of the previous value Vw1_cmd_x(k−1) of the X-axis first target velocity is "equal to or more than a predetermined velocity upper limit value I5 determined in advance," and sets the input-to-output ratio appropriately according to the absolute value of the value Vw1_cmd_x(k−1) when the absolute value of the value Vw1_cmd_x(k−1) is "less than the predetermined velocity upper limit value I5."

Specifically, when the absolute value of the previous value Vw1_cmd_x(k−1) of the X-axis first target velocity falls within a range from the velocity upper limit value I5 to a predetermined value (which value is larger than zero and smaller than the velocity upper limit value I5), the input-to-output ratio is set so as to be decreased gradually as the absolute value of the previous value Vw1_cmd_x(k−1) is increased. When the absolute value of the previous value Vw1_cmd_x(k−1) is equal to or less than the predetermined value, the input-to-output ratio is set to one.

The second filter processing 84 is not limited to the above-described configuration, but may be configured as follows.

When the "output value from the first filter processing 83" which value is input to the second filter processing 84 is equal to or less than an output maximum value (value determined according to the previous value Vw1_cmd_x(k−1) of the X-axis first target velocity, as will be described later), the second filter processing 84 outputs, as the basic target angular velocity ωz_cmda, the output value from the first filter processing 83 as it is. When the "output value from the first filter processing 83" which value is input to the second filter processing 84 exceeds the output maximum value, the second filter processing 84 outputs the output maximum value as the basic target angular velocity ωz_cmda.

Then, in the second filter processing 84, when the absolute value of the previous value Vw1_cmd_x(k−1) of the X-axis first target velocity is "equal to or larger than the velocity upper limit value I5 determined in advance," the output maximum value is set to zero, and when the absolute value of the previous value Vw1_cmd_x(k−1) of the X-axis first target velocity is "less than the velocity upper limit value I5," the output maximum value is set appropriately according to the absolute value of the value Vw1_cmd_x(k−1).

For example, when the absolute value of the previous value Vw1_cmd_x(k−1) of the X-axis first target velocity falls within a range from the velocity upper limit value I5 to a predetermined value (which value is larger than zero and smaller than the velocity upper limit value I5), the output maximum value is set so as to be decreased gradually as the absolute value of the previous value Vw1_cmd_x(k−1) is increased. When the absolute value of the previous value Vw1_cmd_x(k−1) is equal to or less than the predetermined value, the output maximum value is set constant.

The target turning angular velocity determination processing section 80 next performs target angular velocity arithmetic processing 85. In the target angular velocity arithmetic processing 85, the target turning angular velocity ωz_cmd is calculated (determined) by adding together the basic target angular velocity ωz_cmda output from the second filter processing 84 and the basic turning angular velocity command ωjs, and the calculation result is output.

Since the target turning angular velocity determination processing section 80 is configured as described above, the target turning angular velocity ωz_cmd is a value other than zero when a turning command is output from the joystick 12. The processing of the control device 21 described above therefore determines the first target velocity Vw1_cmd_xy and the second target velocity Vw2_cmd_xy according to the target turning angular velocity ωz_cmd. The vehicle 1 is thereby controlled so as to turn.

In a case where no turning command is output from the joystick 12, the basic turning angular velocity command ωjs is zero, so that the target turning angular velocity ωz_cmd coincides with the basic target angular velocity ωz_cmda. In this case, when the yaw rate ωz_act_filt is zero, the target turning angular velocity ωz_cmd is zero. In such a state, the respective Y-axis components of the first target velocity Vw1_cmd_xy and the second target velocity Vw2_cmd_xy have the same magnitude. The vehicle 1 is thereby controlled so as not to cause turning behavior at least.

Even in the case where no turning command is output from the joystick 12, when the yaw rate ωz_act_filt is not zero, the target turning angular velocity ωz_cmd is a value other than zero when the "output ωz_act_filt·K of the gain multiplication processing 82 which output is determined according to the yaw rate ωz_act_filt" is equal to or more than the lower limit value I1 and the "previous value Vw1_cmd_x(k−1) of the X-axis first target velocity" is less than the velocity upper limit value I5. Thus, as described above, the control device 21 determines the first target velocity Vw1_cmd_xy and the second target velocity Vw2_cmd_xy such that the respective Y-axis components of the first target velocity Vw1_cmd_xy and the second target velocity Vw2_cmd_xy have different magnitudes, and the vehicle 1 is controlled so as to turn about the yaw axis.

A state in which the yaw rate ωz_act_filt is a value other than zero in the case where no turning command is output from the joystick 12 can be considered to be a state in which an external twisting force for turning the vehicle 1 about the yaw axis, rather than turning the vehicle 1 by controlling the control device 21 is applied to the vehicle 1, wherein the yaw axis is substantially vertical with respect to the vehicle (which state will hereinafter be referred to as an "external force application state").

In such instance, for example, the occupant boarded on the occupant boarding member 5 may be attempting to turn the vehicle 1 while touching one foot to the floor surface at a time of a stop (for example a turn with a small turning radius). In such a case, when the control device 21 controls the moving operation of the first moving operation unit 3 and the second moving operation unit 4 so as not to turn the vehicle 1 because no turning command is output from the joystick 12, the controllability of the vehicle 1 for the occupant may be degraded.

However, in the present embodiment, even in the case where no turning command is output from the joystick 12, when an external force for turning the vehicle 1 about the yaw axis with one foot touched to the floor surface is applied to the vehicle 1 (when the yaw rate ωz_act_filt is not zero), for example, as described above, the vehicle 1 can be easily turned about the yaw axis within the ranges of the conditions as described above. This improves the controllability of the vehicle 1.

Incidentally, in the present embodiment, the external force application state is a state in which the output ωz_act_filt·K of the gain multiplication processing 82 is equal to or more than the lower limit value I1 in the case where no turning command is output from the joystick 12. "I1/K" in the present embodiment corresponds to a predetermined first value in the present invention.

In addition, when the "output ωz_act_filt·K of the gain multiplication processing 82 which output is determined according to the yaw rate ωz_act_filt" is less than the lower limit value I1, the first filter processing 83 sets a basic target velocity Vw2_cmda_y to zero irrespective of whether or not a turning command is output from the joystick 12. Thus, when a turning command is output from the joystick 12, the target turning angular velocity ωz_cmd coincides with the basic turning angular velocity command ωjs. On the other hand, when no turning command is output from the joystick 12, the target turning angular velocity ωz_cmd is set to zero.

Since the target turning angular velocity determination processing section 80 is thus configured (the first filter processing 83 and the target angular velocity arithmetic processing 85), a state in which the "output ωz_act_filt·K of the gain multiplication processing 82 which output is determined according to the yaw rate ωz_act_filt" is less than the lower limit value I1 in the case where no turning command is output from the joystick 12 is not considered to be an external force application state, and then the target turning angular velocity ωz_cmd is set to zero.

Thus, in a state of a turn being made at a very slight angular velocity by slight movement of the body of the occupant boarded on the occupant boarding member 5 (the angular velocity is less than the lower limit value I1), for example, the occupant does not intend to turn the vehicle 1. However, when such a state is included as an external force application state, the control device 21 performs turning processing. A turn not intended by the occupant may thereby occur.

In view of the above, in the present embodiment, when the external force application state is defined as a state in which the basic turning angular velocity command ωjs is zero and the "output ωz_act_filt·K of the gain multiplication processing 82 which output is determined according to the yaw rate ωz_act_filt" is equal to or more than the lower limit value I1, as described above, the vehicle 1 can be prevented from turning as a result of slight movement of the body of the occupant, for example. This improves the controllability of the vehicle 1.

In addition, in the target turning angular velocity determination processing section 80, an effect of removing the noise component of the yaw rate ωz_act can be obtained by using the yaw rate ωz_act_filt resulting from the application of the low-pass filter processing 81 to the yaw rate ωz_act. It is thereby possible to remove the detection noise of the yaw rate sensor 23, slight changes in the yaw rate ωz_act due to disturbances occurring in the vehicle 1, and the like. The control device 21 can therefore control the vehicle 1 more appropriately.

In addition, in the first filter processing 83, when the "output ωz_act_filt·K of the gain multiplication processing 82 which output is determined according to the yaw rate ωz_act_filt" exceeds the upper limit value I2, the output of the first filter processing 83 is limited to the output upper limit value O1. That is, the control device 21 limits the output of the first filter processing 83 to the output upper limit value O1 when the yaw rate ωz_act_filt of the vehicle 1 is high (when the vehicle 1 is turning fast). Thus, when no turning command is output from the joystick 12, the magnitude of the target turning angular velocity ωz_cmd is set to the output upper limit value O1 at a maximum.

Further, since the target turning angular velocity determination processing section 80 is thus configured (the first filter processing 83 and the target angular velocity arithmetic processing 85), in the case where "no turning command is output from the joystick 12" and "ωz_act_filt·K>I2" (this case represents an external force application state because I2>I1), the magnitude of the target turning angular velocity ωz_cmd is limited to the output upper limit value O1 at a maximum. Therefore, the occurrence of a situation such as fast turning, for example, can be prevented, so that the controllability of the vehicle 1 can be improved.

"I1/K" in the present embodiment corresponds to a predetermined first value in the present invention. "I2/K" in the present embodiment corresponds to a predetermined second value in the present invention. "O1" in the present embodiment corresponds to a predetermined first upper limit value in the present invention.

In this case, "'Predetermined First Value (I1/K)'<'Predetermined Second Value (I2/K)'." In addition, in this case, "'Predetermined Second Value (I2/K)'>'Predetermined First Upper Limit Value O1'." The predetermined second value (I2/K) is set to a value such that the occupant does not feel that the vehicle 1 is turning too fast. The target turning angular velocity in the external force application state is thus set smaller than the value (I2/K) such that the occupant does not feel that the vehicle 1 is turning too fast. Therefore the controllability of the vehicle 1 can be improved.

In addition, the second filter processing 84 sets the basic target angular velocity ωz_cmda to zero when the absolute value of the previous value Vw1_cmd_x(k−1) of the X-axis first target velocity is equal to or more than the velocity upper limit value I5. In this case, when no turning command is output from the joystick 12, the magnitude of the target turning angular velocity ωz_cmd is set to zero (that is, no turning behavior occurs).

Therefore, when the vehicle 1 is moving forward or moving rearward at a high velocity (Vw1_cmd_x(k−1)≥I5), for example, in the external force application state, the vehicle 1 can be prevented from turning, so that the controllability of the vehicle 1 can be improved.

"I5" in the present embodiment corresponds to a predetermined fifth value in the present invention. In addition, the second filter processing 84 "setting the magnitude of the target turning angular velocity ωz_cmd to zero when no turning command is output from the joystick 12 and the absolute value of the previous value Vw1_cmd_x(k−1) of the X-axis first target velocity is equal to or more than the velocity upper limit value I5" corresponds to "the turning processing is not performed when a target value or an observed value of a moving velocity in at least the forward-rearward direction of the inverted pendulum type vehicle is equal to or more than a predetermined fifth value."

According to the present embodiment, the turning processing is not performed when the magnitude of the moving velocity is equal to or more than the velocity upper limit value I5 irrespective of whether the moving velocity is a velocity in the forward direction or a velocity in the rearward direction. However, the present invention is not limited to this. A value to be compared with the moving velocity in the forward direction and a value to be compared with the moving velocity in the rearward direction may be set as different values.

Figure 10:
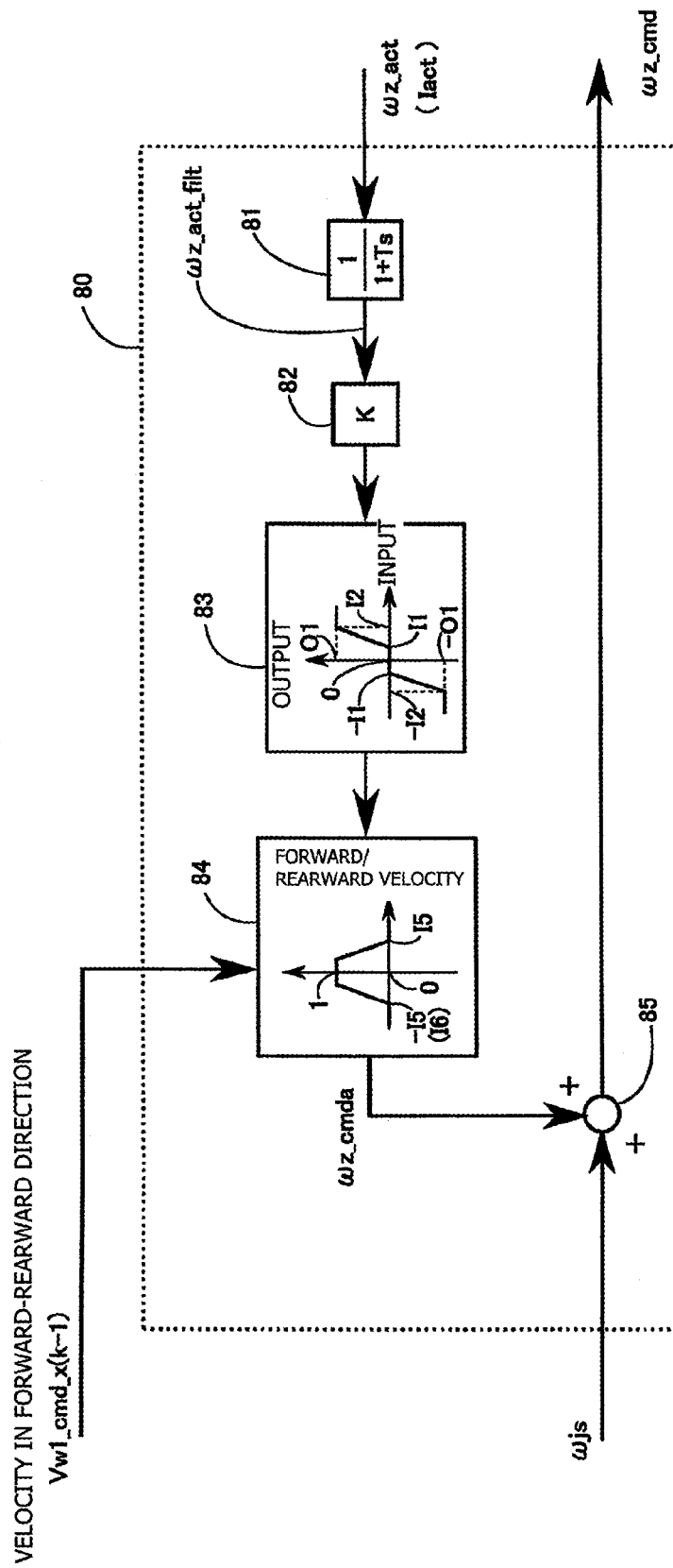
FIG. 10 is a block diagram showing the processing of a target turning angular velocity determination processing section in the illustrative embodiment.

In other words, as shown in FIG. 10, the turning processing may be prevented from being performed when the moving velocity in the forward direction (right side of the axis of abscissas of the second filter processing 84) is equal to or more than the velocity upper limit value I5, and the turning processing may be prevented from being performed when the moving velocity in the rearward direction (left side of the axis of abscissas of the second filter processing 84) is equal to or more than a "velocity upper limit value I6" different from the velocity upper limit value I5 (that is, "I5≠I6").

With such a configuration (that is, "by configuring the predetermined fifth value at times of movement in the forward direction to be different from that at times of movement in the rearward direction," or "the turning processing is configured not to be performed when the target value or the observed value of the moving velocity in the forward direction is equal to or more than a predetermined sixth value or when the target value or the observed value of the moving velocity in the rearward direction is equal to or more than a predetermined seventh value"), the controllability of the vehicle 1 can be improved by setting the moving velocity at which the turning processing is performed in a state of moving in the rearward direction slower than in a state of moving in the forward direction (that is, by setting "I5>I6"), because it is difficult for the occupant in the state of moving in the rearward direction to bring an ambient environment in the moving direction into view sufficiently, for example.

In this case, as for the forward direction, "I5" corresponds to the predetermined fifth value in the present invention, and as for the rearward direction, "I6" corresponds to the predetermined fifth value in the present invention. Thus, the predetermined fifth value in the present invention also includes different values set according to the moving directions.

In addition, in the present embodiment, the target turning angular velocity determination processing section 80 makes the basic target angular velocity ωz_cmda increase as the magnitude of the yaw rate ωz_act_filt is increased when the yaw rate ωz_act_filt is "'I1/K'≤'ωz_act_filt'≤'I2/K'." Thus, when no turning command is output from the joystick 12, the target turning angular velocity ωz_cmd increases as the magnitude of the yaw rate ωz_act_filt is increased.

Thus, the vehicle 1 is controlled to turn faster as the magnitude of an external force for turning the vehicle 1 about the yaw axis, which external force is applied to the vehicle 1 when the occupant turns the vehicle 1 with one foot touched to the floor surface, for example, is increased. Therefore the controllability of the vehicle 1 can be improved.

According to the present embodiment, the control device 21 controls the vehicle 1 so as to turn the vehicle 1 when a turning command is output from the joystick 12 in states other than the external force application state. That is, the "operation by the occupant of swinging the joystick 12 in the left-right direction" to output a turning command from the joystick 12 in the present embodiment corresponds to a "predetermined steering operation of steering the inverted pendulum type vehicle so as to turn the inverted pendulum type vehicle by the occupant boarded on the occupant boarding member" in the present invention.

However, the "predetermined steering operation" is not limited to the "operation of the joystick 12 for turning." The control device 21 may for example generate a turning command when the occupant boarded on the occupant boarding member 5 tilts the occupant boarding member 5 in the lateral direction, determine a target turning angular velocity according to the tilting, and input a "turning angular velocity obtained by adding together the 'target turning angular velocity according to the tilting' and the 'basic turning angular velocity command ωjs'" to the target turning angular velocity determination processing section 80 in place of the basic turning angular velocity command ωjs. In such a case, the "predetermined steering operation" includes the "operation of the joystick 12 for turning" and the "tilting of the occupant boarding member 5 for turning."

In addition, when the vehicle 1 does not have an operating device such as the joystick 12 or the like, and the vehicle 1 is moved and turned by only the tilting of the occupant boarding member 5 by body weight movement, the predetermined steering operation is the "tilting of the occupant boarding member 5 for turning." In such a case, a basic target turning angular velocity is determined according to the actual angle of inclination θb_act_xy of the occupant boarding member 5. Then, it suffices to input the determined "basic target turning angular velocity" to the target turning angular velocity determination processing section 80 in place of the "basic turning angular velocity command ωjs."

In addition, in the present embodiment, the yaw rate ωz_act is used as an index for determining whether the external force application state is produced. However, the present invention is not limited to this. It suffices for the index to indicate a state of an external force for turning the vehicle 1 about the yaw axis being applied to the vehicle 1 when the predetermined steering operation is not performed.

For example, in a state of the vehicle 1 being stopped, the first moving operation unit and the second moving operation unit are both controlled to maintain the stopped state. Therefore, a driving force is generated from at least one of the electric motors 8a and 8b as the first actuator device and the electric motor 17 as the second actuator device so as to resist the force for turning the inverted pendulum type vehicle which force is acting from the occupant on the inverted pendulum type vehicle.

In other words, the driving force generated from at least one of the electric motors 8a and 8b and the electric motor 17 when the predetermined steering operation is not performed represents the "force for turning the vehicle 1 about the yaw axis" which force is acting on the vehicle 1. Therefore, the vehicle 1 may include state quantity detecting unit for detecting a state quantity representing the driving force output from the electric motors 8a and 8b or the electric motor 17, and the basic target angular velocity ωz_cmda may be determined according to the detected state quantity.

Figure 11:
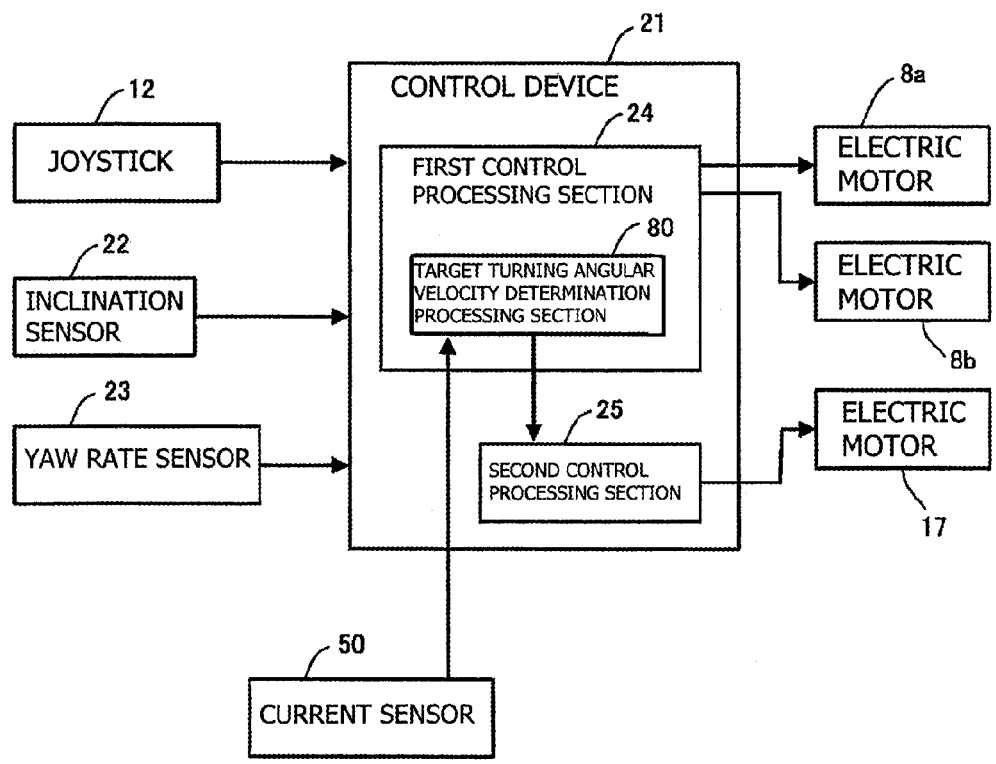
FIG. 11 is a block diagram showing a configuration for the control of an inverted pendulum type vehicle according to another illustrative embodiment of the present invention.

The driving force (torque) of an electric motor is determined according to a current value. Hence, for example, the state quantity may be the value of a current flowing through the electric motors 8a and 8b or the electric motor 17. In this case, the vehicle 1 includes a current sensor 50, for example, as the state quantity detecting unit (FIG. 11).

Then, a detected current value Iact as a current value detected by the current sensor is input to a target turning angular velocity determination processing section 80 in place of the yaw rate ωz_act (in parentheses in FIG. 10). At this time, low-pass filter processing 81, second filter processing 84, and target angular velocity arithmetic processing 85 are basically the same as in the present embodiment. In addition, a gain constant K in gain multiplication processing 82 is set as a constant such as converts the current value into an angular velocity.

In addition, first filter processing 83 is the same as the first filter processing 83 in the present embodiment except for a different input value (Iact_filt·K), which is not the angular velocity. The first filter processing 83 outputs zero when the input value is less than a lower limit value I1, outputs an output upper limit value O1 when the input value exceeds an upper limit value I2, and outputs a value corresponding to the input value when the input value is equal to or more than the lower limit value I1 and equal to or less than the upper limit value I2. In this case, Iact_filt denotes the current value Iact resulting from the low-pass filter processing 81.

Also when the target turning angular velocity determination processing section 80 is configured on the basis of the current value as described above, a similar effect to that in the case of using the yaw rate ωz_act as in the present embodiment is obtained. "I1/K" in the present form corresponds to a predetermined third value in the present invention. "I2/K" in the present form corresponds to a predetermined fourth value in the present invention. "O1" in the present form corresponds to a predetermined second upper limit value in the present invention.

In this case, "'Predetermined Third Value (I1/K)'<'Predetermined Fourth Value (I2/K)'." In addition, in this case, "'Predetermined Fourth Value (I2/K)'>'Predetermined Second Upper Limit Value O1'." The predetermined fourth value (I2/K) is set to a value such that the occupant does not feel that the vehicle 1 is turning too fast. The target turning angular velocity in the external force application state is thus set smaller than the value (I2/K) such that the occupant does not feel that the vehicle 1 is turning too fast. Therefore the controllability of the vehicle 1 can be improved.

Incidentally, as the current value input to the target turning angular velocity determination processing section 80, various other values may be used, such for example as an average value or a maximum value of the respective current values of the electric motors 8a and 8b as the first actuator device and the electric motor 17 as the second actuator device. One of these values is used as appropriate according to a use of the vehicle 1 or the like.

Further, the state quantity detecting unit in this case is not limited to a current sensor. When a current value is obtained from a module (for example a control circuit or the like) that determines the value of the current supplied to an electric motor, the state quantity detecting unit also includes a constitution for obtaining the current value.

In addition, a strain gauge may be provided to the base 2, and a detection result (force) output from the strain gauge may be input to the target turning angular velocity determination processing section 80. In addition, a difference between the "velocity in the left-right direction of the first moving operation unit 3" and the "velocity in the left-right direction of the second moving operation unit 4" may be input to the target turning angular velocity determination processing section 80.

Further, the target turning angular velocity determination processing section 80 of the vehicle 1 in the present embodiment may be configured without at least one of the low-pass filter processing 81, the first filter processing 83, and the second filter processing 84. Also in such a case, an effect of "being able to turn the vehicle easily even in a state of not performing steering operation" in the present invention can be obtained.

In addition, in the present embodiment, the "previous value Vw1_cmd_x(k−1) of the X-axis first target velocity" is used as the velocity in the forward-rearward direction of the vehicle 1, and the turning processing is not performed when the value is equal to or more than the velocity upper limit value I5 (the basic target velocity Vw2_cmda_y is set to zero). However, the value at the time of determining whether the value is equal to or more than the velocity upper limit value I5 (which value at the time of determining whether the value is equal to or more than the velocity upper limit value I5 will hereinafter be referred to as a "target velocity") is not limited to the "previous value Vw1_cmd_x(k−1) of the X-axis first target velocity," but may be the value of an X-axis component of a previous value Vw2_cmd_xy(k−1) of the second target velocity, for example.

Further, the vehicle 1 may include a velocity sensor for detecting the velocity of the vehicle 1, and a result of the detection by the velocity sensor may be set as the target velocity. In addition, the control device 21 may set the velocity Vb_estm1_xy of the center of gravity of the whole of the vehicle system, which value is estimated by the center-of-gravity velocity estimating section 33, as the target velocity. Further, the target velocity is not limited to a velocity in the X-axis direction (that is, the forward-rearward direction of the vehicle 1), but may be a velocity in every direction including the Y-axis direction (that is, the left-right direction of the vehicle 1).

In other words, although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. An inverted pendulum type vehicle including at least a first moving operation unit operable to move on said floor surface, a first actuator device for driving the first moving operation unit, a base assembled with the first moving operation unit and the first actuator device, and an occupant boarding member assembled to the base so as to be tiltable with respect to a vertical direction, the first moving operation unit being configured to move in all directions including a forward-rearward direction and a left-right direction of an occupant boarded on the occupant boarding member by a driving force of the first actuator device, the inverted pendulum type vehicle comprising:

a second moving operation coupled to one of the first moving operation unit and the base such that an interval is formed between the second moving operation unit and the first moving operation unit in the forward-rearward direction, said second moving operation unit being configured to move on the floor surface in all the directions;

a second actuator device for generating a driving force for making at least the second moving operation unit move in the left-right direction; and a control device for performing a turning processing for controlling the first actuator device and the second actuator device such that the second moving operation unit has a different velocity from the first moving operation unit in the left-right direction when the occupant boarded on the occupant boarding member performs a predetermined steering operation of steering the inverted pendulum type vehicle for turning the inverted pendulum type vehicle;

wherein:

the control unit determines that the predetermined steering operation was performed based on at least one of a turning command output from a joystick or a tilting of the occupant boarding member for turning, and the control device performs the turning processing when the predetermined steering operation is performed, and also when at least an external force application state of an external twisting force for turning the inverted pendulum type vehicle about a substantially vertical yaw axis thereof is applied to the inverted pendulum type vehicle.

2. The inverted pendulum type vehicle according to claim 1, further comprising a turning angular velocity detecting unit for detecting a turning angular velocity of the inverted pendulum type vehicle;

wherein the external force application state includes at least a state of the predetermined steering operation not being performed and magnitude of the turning angular velocity detected by the turning angular velocity detecting unit being equal to or more than a predetermined first value.

3. The inverted pendulum type vehicle according to claim 2, wherein the control device increases magnitude of a target turning angular velocity, the target turning angular velocity being a turning angular velocity as a target for the inverted pendulum type vehicle in the turning processing, as magnitude of a detected turning angular velocity as the turning angular velocity detected by the turning angular velocity detecting unit is increased in the external force application state; and wherein the control device controls the first actuator device and the second actuator device so that an actual turning angular velocity of the inverted pendulum type vehicle becomes the target turning angular velocity.

4. The inverted pendulum type vehicle according to claim 3, wherein when the magnitude of the detected turning angular velocity exceeds a predetermined second value in the external force application state, the control device limits the magnitude of the target turning angular velocity to a predetermined first upper limit value.

5. The inverted pendulum type vehicle according to claim 1, further comprising
a state quantity detecting unit for detecting a state quantity representing the driving force of one of the first actuator device and the second actuator device;
wherein the external force application state includes at least a state of the predetermined steering operation not being performed and magnitude of the state quantity detected by the state quantity detecting unit being equal to or more than a predetermined third value.

6. The inverted pendulum type vehicle according to claim 2, further comprising a state quantity detecting unit for detecting a state quantity representing the driving force of one of the first actuator device and the second actuator device;
wherein the external force application state includes at least a state of the predetermined steering operation not being performed and magnitude of the state quantity detected by the state quantity detecting unit being equal to or more than a predetermined third value.

7. The inverted pendulum type vehicle according to claim 5, wherein the control device increases magnitude of a target turning angular velocity, the target turning angular velocity being a turning angular velocity as a target for the inverted pendulum type vehicle in the turning processing, as magnitude of a detected state quantity as the state quantity detected by the state quantity detecting unit is increased in the external force application state, and
the control device controls the first actuator device and the second actuator device so that an actual turning angular velocity of the inverted pendulum type vehicle becomes the target turning angular velocity.

8. The inverted pendulum type vehicle according to claim 7, wherein when the magnitude of the detected state quantity exceeds a predetermined fourth value in the external force application state, the control device limits the magnitude of the target turning angular velocity to a predetermined second upper limit value.

9. The inverted pendulum type vehicle according to claim 1, wherein the control device does not perform the turning processing when one of a target value and an observed value of a moving velocity in at least the forward-rearward direction of the inverted pendulum type vehicle is equal to or more than a predetermined fifth value at least in a state of the predetermined steering operation not being performed and in the external force application state.

10. The inverted pendulum type vehicle according to claim 2, wherein the control device does not perform the turning processing when one of a target value and an observed value of a moving velocity in at least the forward-rearward direction of the inverted pendulum type vehicle is equal to or more than a predetermined fifth value at least in a state of the predetermined steering operation not being performed and in the external force application state.

11. The inverted pendulum type vehicle according to claim 3, wherein the control device does not perform the turning processing when one of a target value and an observed value of a moving velocity in at least the forward-rearward direction of the inverted pendulum type vehicle is equal to or more than a predetermined fifth value at least in a state of the predetermined steering operation not being performed and in the external force application state.

12. The inverted pendulum type vehicle according to claim 4, wherein the control device does not perform the turning processing when one of a target value and an observed value of a moving velocity in at least the forward-rearward direction of the inverted pendulum type vehicle is equal to or more than a predetermined fifth value at least in a state of the predetermined steering operation not being performed and in the external force application state.

13. The inverted pendulum type vehicle according to claim 5, wherein the control device does not perform the turning processing when one of a target value and an observed value of a moving velocity in at least the forward-rearward direction of the inverted pendulum type vehicle is equal to or more than a predetermined fifth value at least in a state of the predetermined steering operation not being performed and in the external force application state.

14. The inverted pendulum type vehicle according to claim 6, wherein the control device does not perform the turning processing when one of a target value and an observed value of a moving velocity in at least the forward-rearward direction of the inverted pendulum type vehicle is equal to or more than a predetermined fifth value at least in a state of the predetermined steering operation not being performed and in the external force application state.

15. The inverted pendulum type vehicle according to claim 7, wherein the control device does not perform the turning processing when one of a target value and an observed value of a moving velocity in at least the forward-rearward direction of the inverted pendulum type vehicle is equal to or more than a predetermined fifth value at least in a state of the predetermined steering operation not being performed and in the external force application state.

16. An inverted pendulum type vehicle, comprising:
a first moving operation unit operable to move on a floor surface;
a first actuator device for driving the first moving operation unit;
a base assembled with the first moving operation unit and the first actuator device;
a second moving operation unit coupled to the first moving operation unit;
a second actuator device for driving the second moving operation unit;
an occupant boarding member assembled to the base so as to be tiltable with respect to a vertical direction; and
a control device for performing a turning processing for controlling the first actuator device and the second actuator device such that the second moving operation unit has a different velocity from the first moving operation unit in the left-right direction when the occupant boarded on the occupant boarding member performs a predetermined steering operation of steering the inverted pendulum type vehicle for turning the inverted pendulum type vehicle;
wherein:
the control unit determines that the predetermined steering operation was performed based on at least one of a turning command output from a joystick or a tilting of the occupant boarding member for turning, and
the control device is operable to perform the turning processing when an external force application state of an external twisting force for turning the inverted pendulum type vehicle about a substantially vertical yaw axis thereof is applied to the inverted pendulum type vehicle.

17. The inverted pendulum type vehicle according to claim 16, wherein the control device is further operable to increase magnitude of a target turning angular velocity, the target turning angular velocity being a turning angular velocity as a target for the inverted pendulum type vehicle in the turning processing, when magnitude of a detected turning angular velocity as the turning angular velocity detected by the turning angular velocity detecting unit is increased in the external force application state.

18. The inverted pendulum type vehicle according to claim 16, further comprising
a current sensor for detecting a state quantity representing the driving force of the first actuator device and the second actuator device;
wherein the external force application state includes at least a state of the predetermined steering operation not being performed and magnitude of the state quantity detected by the current sensor being equal to or more than a predetermined third value.

19. An inverted pendulum type vehicle, comprising:
a first moving operation unit operable to move on a floor surface;
a first actuator device for driving the first moving operation unit;
a base assembled with the first moving operation unit and the first actuator device;
a second moving operation unit coupled to the first moving operation unit;
a second actuator device for driving the second moving operation unit; and
a control device operable to determine that a predetermined steering operation was performed based on at least one of a turning command output from a joystick or a tilting of the base for turning and turn said inverted pendulum type vehicle when either a predetermined steering operation is determined or an external twisting force is applied for turning the inverted pendulum type vehicle about a substantially vertical yaw axis thereof by controlling velocities of said first moving operation unit and said second moving operation unit.

20. The inverted pendulum device according to claim 16, wherein, the control device determines that the external force application state is applied when the external twisting force is applied for turning the inverted pendulum type vehicle and an immediately previous velocity in a forward-rearward direction was less than a predetermined value.

* * * * *